US011600070B2

(12) United States Patent
Elgamal et al.

(10) Patent No.: US 11,600,070 B2
(45) Date of Patent: Mar. 7, 2023

(54) DATA-DRIVEN EVENT DETECTION FOR COMPRESSED VIDEO

(71) Applicant: AT&T Intellectual Property I, L.P., Atlanta, GA (US)

(72) Inventors: Tarek Elgamal, Champaign, IL (US); Shu Shi, Summit, NJ (US); Varun Gupta, Morristown, NJ (US); John Murray, Denville, NJ (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/221,947

(22) Filed: Apr. 5, 2021

(65) Prior Publication Data

US 2021/0224549 A1 Jul. 22, 2021

Related U.S. Application Data

(62) Division of application No. 16/552,443, filed on Aug. 27, 2019, now Pat. No. 10,970,555.

(51) Int. Cl.
*G06N 3/08* (2006.01)
*H04N 7/18* (2006.01)
(Continued)

(52) U.S. Cl.
CPC ........... *G06V 20/49* (2022.01); *G06K 9/6256* (2013.01); *G06N 3/08* (2013.01); *H04N 5/23229* (2013.01);
(Continued)

(58) Field of Classification Search
CPC ........ G06V 20/49; H04N 19/87; H04N 7/185; G06N 3/08
See application file for complete search history.

(56) References Cited

U.S. PATENT DOCUMENTS 6,058,210 A 5/2000 de Queiroz
6,959,044 B1 10/2005 Jin
(Continued)

FOREIGN PATENT DOCUMENTS

| DE | 112020000054 T5 | * | 3/2021 | ............. G06F 1/206 |
| WO | WO-2020263374 A1 | * | 12/2020 | ......... H04L 65/4069 |
| WO | WO-2021003059 A1 | * | 1/2021 | .............. H04W 4/40 |

OTHER PUBLICATIONS

A. M. M. Ali, N. M. Ahmad, and A. H. M. Amin, "Cloudlet-based cyber foraging framework for distributed video surveillance provisioning," in Proc. 4th World Congr. Inf. Commun. Technol. (WICT), Bandar Hilir, Malaysia, 2015. (Year: 2015).*

(Continued)

*Primary Examiner* — Michael Robert Cammarata
(74) *Attorney, Agent, or Firm* — Hartman & Citrin LLC

(57) ABSTRACT

A system can obtain a labelled data set, including historic video data and labelled events. The system can divide the labelled data set into historic training/testing data sets. The system can determine, using the historic training data set, a plurality of different parameter configurations to be used by a video encoder to encode a video that includes a plurality of video frames. Each parameter configuration can include a group of pictures ("GOP") size and a scenecut threshold. The system can calculate an accuracy of event detection ("ACC") and a filtering rate ("FR") for each parameter configuration. The system can calculate, for each parameter configuration of the plurality of different parameter configurations, a harmonic mean between the ACC and the FR. The system can then select a best parameter configuration of the plurality of different parameter configurations based upon the parameter configuration that has the highest harmonic mean.

20 Claims, 20 Drawing Sheets

(51) Int. Cl.
*H04N 19/87* (2014.01)
*G06V 20/40* (2022.01)
*G06K 9/62* (2022.01)
*H04N 5/232* (2006.01)
*H04N 19/114* (2014.01)

(52) U.S. Cl.
CPC ........... *H04N 7/185* (2013.01); *H04N 19/114* (2014.11); *H04N 19/87* (2014.11); *G06V 20/44* (2022.01)

(56) References Cited

U.S. PATENT DOCUMENTS

| | | | |
|---|---|---|---|
| 7,889,792 | B2 | 2/2011 | Dumitras |
| 8,837,602 | B2 | 9/2014 | Ammu |
| 8,948,260 | B2 | 2/2015 | Tian |
| 9,628,811 | B2 | 4/2017 | Swazey |
| 9,818,451 | B1 | 11/2017 | Tyagi |
| 9,866,838 | B2 | 1/2018 | Schwartz |
| 9,992,455 | B2 | 6/2018 | Ostby |
| 2006/0109902 | A1 | 5/2006 | Yu |
| 2011/0317982 | A1 | 12/2011 | Xu |
| 2012/0219271 | A1 | 8/2012 | Vunic |
| 2014/0301486 | A1 | 10/2014 | Liao |
| 2014/0376886 | A1 | 12/2014 | Pettersson |
| 2018/0139458 | A1 | 5/2018 | Wang |
| 2019/0325275 | A1 | 10/2019 | Lee |
| 2021/0064884 | A1* | 3/2021 | Elgamal ................ H04N 19/87 |
| 2021/0144517 | A1* | 5/2021 | Guim Bernat ........ H04L 9/3247 |
| 2021/0377804 | A1* | 12/2021 | Sivaraj ................ H04W 28/10 |
| 2022/0197773 | A1* | 6/2022 | Butler ................ H04N 21/234 |
| 2022/0279254 | A1* | 9/2022 | Stokking ................ H04L 65/61 |

OTHER PUBLICATIONS

H. M. Amin, N. M. Ahmad and A. M. M. Ali, "Decentralized face recognition scheme for distributed video surveillance in IoT-cloud infrastructure," 2016 IEEE Region 10 Symposium (TENSYMP), 2016, pp. 119-124, doi: 10.1109/TENCONSpring.2016.7519389. (Year: 2016).*

T. Soyata, R. Muraleedharan, C. Funai, M. Kwon and W. Heinzelman, "Cloud-Vision: Real-time face recognition using a mobile-cloudlet-cloud acceleration architecture," 2012 IEEE Symposium on Computers and Communications (ISCC), 2012, pp. 000059-000066, doi: 10.1109/ISCC.2012.6249269. (Year: 2012).*

A. Aslam and E. Curry, "Towards a Generalized Approach for Deep Neural Network Based Event Processing for the Internet of Multimedia Things," in IEEE Access, vol. 6, pp. 25573-25587, 2018, doi: 10.1109/ACCESS.2018.2823590. (Year: 2018).*

J. Wang et al., "Bandwidth-Efficient Live Video Analytics for Drones Via Edge Computing," 2018 IEEE/ACM Symposium on Edge Computing (SEC), 2018, pp. 159-173, doi: 10.1109/SEC.2018.00019. (Year: 2018).*

G. Liu and J. Zhao, "Key Frame Extraction from MPEG Video Stream," 2010 Third International Symposium on Information Processing, 2010, pp. 423-427, doi: 10.1109/ISIP.2010.63 (Year: 2010).*

X. Qi, C. Liu and S. Schuckers, "IoT Edge Device Based Key Frame Extraction for Face in Video Recognition," 2018 18th IEEE/ACM International Symposium on Cluster, Cloud and Grid Computing (CCGRID), 2018, pp. 641-644, doi: 10.1109/CCGRID.2018.00087. (Year: 2018).*

M. Kini M. and K. Pai, "A Survey on Video Summarization Techniques," 2019 Innovations in Power and Advanced Computing Technologies (i-PACT), 2019, pp. 1-5, doi: 10.1109/i-PACT44901.2019.8960003. (Year: 2019).*

G. Ananthanarayanan, P. Bahl, P. Bod'ik, K. Chintalapudi, M. Philipose, L. Ravindranath, and S. Sinha, "Real-time video analytics: The killer app for edge computing," Computer, vol. 50, No. 10, pp. 58-67, 2017. (Year: 2017).*

T. Chen et al., "Glimpse: Continuous, Real-Time Object Recognition on Mobile Devices," Proc. ACM Conf. Embedded Networked Sensor Systems (SenSys 15), 2015, pp. 26-29. (Year: 2015).*

Yoneyama, Akio et al., "MPEG Encoding Algorithm with Scene Adaptive Dynamic GOP Structure," Multimedia Signal Processing, IEEE 3rd Workshop, Copenhagen, Denmark, pp. 297-302 (Sep. 13, 1999).

Liu, Wang, "GOP Adaptation Coding of H.264/SVC Based on Precise Positions of Video Cuts," KSII transactions on Internet and information systems 8.7 (2014): 2449-2463. Web.

Arachchi, Kodikara et al., "An Intelligent Rate Control Algorithm to Improve the Video Quality at Scene Transitions for off-line MPEG-1/2 Encoders," IEEETransactions on Consumer Electronics, vol. 49, No. 1, Feb. 2003.

* cited by examiner

|  | Disclosed Approach | Uniform Sampling (50 fps/sec) |
|---|---|---|
| Accuracy | 94% | 85.6% |
| Sampling Rate | 2% | 2% |

*FIG. 9A*

|  | Disclosed Approach | Image Similarity | NN on each frame |
|---|---|---|---|
| Compute Time | 1 ms/frame | 30 ms/frame | 75 ms/frame |

*FIG. 9B*

DATA-DRIVEN EVENT DETECTION FOR COMPRESSED VIDEO

CROSS-REFERENCE TO RELATED APPLICATIONS

This application is a division of and claims priority to U.S. patent application Ser. No. 16/552,443, entitled "Data-Driven Event Detection for Compressed Video," filed Aug. 27, 2019, now U.S. Pat. No. 10,970,555, which is incorporated herein by reference in its entirety.

BACKGROUND

According to a 2015 report on the installed base for video surveillance equipment, there is a camera installed for every 29 people on Earth. Video analytics from these cameras are used for traffic control, retail store monitoring, surveillance and security, as well as consumer applications such as digital assistants for real-time decisions. One of the major problems in video analytics is deciding which parts of the video are critical to a real-time decision. For example, a security camera that is watching a parking lot for 24 hours per day will typically have only a few frames that show a potential risk of theft or damage. A camera that captures 30 frames per second ("fps") can record more than 2.5 million frames per day and processing this massive amount of data is prohibitively expensive.

SUMMARY

Concepts and technologies disclosed herein are directed to aspects of data-driven event detection for compressed video. According to one aspect of the concepts and technologies disclosed herein, a system can obtain a labelled data set that includes historic video data having a plurality of labelled events. The system can divide the labelled data set into a historic training data set and a historic testing data set. The system can determine, using the historic training data set, a plurality of different parameter configurations to be used by a video encoder to encode a video that includes a plurality of video frames. Each parameter configuration of the plurality of different parameter configurations can include a group of pictures ("GOP") size and a scenecut threshold. The system can calculate an accuracy of event detection and a filtering rate for each parameter configuration of the plurality of different parameter configurations. The system can calculate, for each parameter configuration of the plurality of different parameter configurations, a harmonic mean between the accuracy of event detection and the filtering rate. The system can then select a best parameter configuration of the plurality of different parameter configurations based upon the parameter configuration that has the highest harmonic mean.

In some embodiments, the system can deploy the best parameter configuration on the video encoder. The video encoder can operate on or otherwise be associated with a camera. The camera may be a part of a device such as a mobile device, for example. The video encoder can receive the video, apply the best parameter configuration to the video, and encode the video based upon the best parameter configuration. The output of the video encoder can include one I-Frame per each event in the video. The event can be part of an object recognition task or some other task.

According to another aspect disclosed herein, a network system can include a camera and a video encoder associated with the camera. The video encoder can include a best parameter configuration of a GOP size and a scenecut threshold. The network system also can include a mobile edge cloud ("MEC") network that includes a MEC object recognizer deployed in a MEC neural network, and a central cloud ("CC") network that includes a CC object recognizer deployed in a CC neural network. The camera can capture a video that includes a plurality of video frames. The video encoder can encode the video based upon the best parameter configuration and can generate an encoded video that includes a plurality of I-frames. The MEC object recognizer can receive the encoded video and can perform at least a first operation to process at least a first I-frame of the encoded video. The CC object recognizer can receive the first I-frame from the MEC object recognizer after the MEC object recognizer has performed at least the first operation. The CC object recognizer can perform at least a second operation to further process at least the first I-frame of the encoded video.

The MEC object recognizer can perform the first operation within a time referred to herein as a MEC execution cost. The plurality of I-frames can include an N number of I-frames. In some embodiments, a total latency for the N number of I-frames is equal to a product of the N number of I-frames and the MEC execution cost. A transmission cost, also in terms of time, can be associated with transmitting the first I-frame from the MEC object recognizer to the CC object recognizer. A queuing time can be associated with the MEC object recognizer queuing the first operation for at least the first I-frame. Also, the CC object recognizer can perform the second operation within a time referred to herein as a CC execution cost. In some embodiments, a total latency for the N number of I-frames is equal to a sum of a product of the N number of I-frames and the queuing time, the transmission cost, and the CC execution cost.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

BRIEF DESCRIPTION OF THE DRAWINGS

FIGS. 9A and 9B are example tables showing example results of using a training data set of 170 videos comprising 50,000 frames and a test data set of 1,900 videos comprising 800,000 frames.

DETAILED DESCRIPTION

Figure 1:
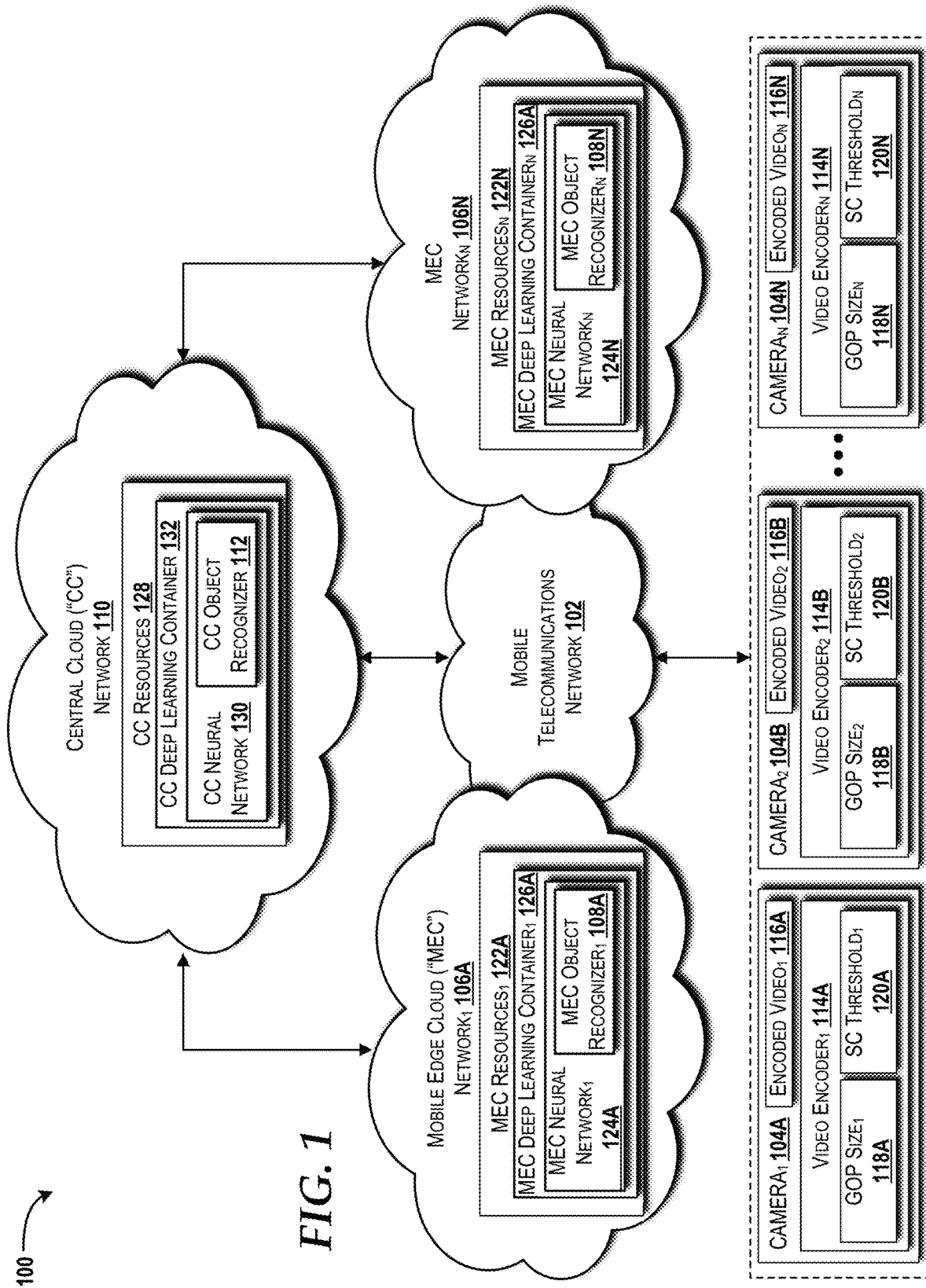
FIG. 1 is a block diagram illustrating aspects of an illustrative network system for various concepts and technologies disclosed herein.

The concepts and technologies disclosed herein provide a novel data-driven event detection method for compressed videos. As noted above, a video camera that captures 30 fps can record more than 2.5 million frames per day and processing this massive amount of data is prohibitively expensive. Therefore, a need exists to process only a small sample of the 2.5 million frames. However, choosing which frames to sample without missing the event of interest is a challenging problem.

A sequence of frames represented as a video only has a subset of frames known as key frames or I-frames that are encoded in the full resolution. The rest of the frames are known as predicted frames (P-frames) and bidirectional frames (B-frames). P-frames and B-frames only encode any differences with their references frames.

A video can be represented as a sequence of clips, where each clip is known as a group of pictures ("GOP") that includes one I-frame and an arbitrary number of P-frames and B-frames. The maximum number of frames in a GOP (i.e., GOP size) is a configurable parameter in a video encoder. GOP has a default value that attempts to balance the tradeoff between high compression ratio and fast decoding. Another configurable parameter in the video encoder is a scene cut ("SC") threshold, which determines when a new GOP is created. The video encoder calculates a similarity metric for every frame to estimate how different a specific frame is from the previous frame. If the value is lower than the SC threshold, a new GOP is created and an initial I-frame for the new GOP is created.

According to one aspect of the concepts and technologies disclosed herein, configurable video encoding parameters, including the GOP size and SC threshold, can be tuned to select a subset of video frames to provide to a machine learning-based object recognizer in consideration of a balance between the number of frames selected and the performance of the object recognizer. Without these novel features of the concepts and technologies disclosed herein, every video frame would be sent to the object recognizer. This requires too much bandwidth. The concepts and technologies disclosed herein show that only around 5% of the video frames are required to achieve similar recognition performance as if 100% of the video frames are sent to the object recognizer. A goal of video encoding parameter tuning is to determine how to select this 5% of frames without impacting object recognition performance.

According to another aspect of the concepts and technologies disclosed herein, the object recognizer can be executed, in part, in a deep learning neural network deployed at the edge of a mobile telecommunications network and, in part, in a deep learning neural network deployed at a central cloud. A pipeline of operations can include some operations executed at the edge and the remaining operations executed at the cloud. In this manner, the overall throughput can be increased when processing concurrent tasks.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Turning now to FIG. 1, a network system 100 in which embodiments of the concepts and technologies disclosed herein will be described. The illustrated network system 100 includes a mobile telecommunications network 102 operated, at least in part, by one or more mobile network operators (not shown) to facilitate communications between a plurality of cameras 104A-104N (hereinafter, at times, referred to individually as "a camera 104," or collectively as "cameras 104") and machine learning-based object recognizers deployed, at least in part, in mobile edge cloud ("MEC") networks 106A-106N (hereinafter, at times, referred to individually as "an MEC network 106," or collectively as "MEC networks 106") as MEC object recognizers 108A-108N (hereinafter, at times, referred to individually as "an MEC object recognizer 108," or collectively as "MEC object recognizers 108") and, at least in part, in a central cloud ("CC") network 110 as a CC object recognizer 112 (multiple CC object recognizers 112 are also contemplated). More particularly, the camera1 104A, the camera 2104B, and the camera$_n$ 104N can capture video (not shown) and can encode the video via video encoders 114A-114N (hereinafter, at times, referred to individually as "a video encoder 114," or collectively as "video encoders 114") to create encoded video 116A-116N (hereinafter, at times, referred to individually as "an encoded video 116," or collectively as "encoded video 116"), respectively. The video encoders 114 can be tuned by configuring video encoding parameters, including GOP sizes 118A-118N (hereinafter, at times, referred to individually as "a GOP size 118," or collectively as "GOP sizes 118") and SC thresholds 120A-120N (hereinafter, at times, referred to individually as "a SC threshold 120," or collectively as "SC thresholds 120"), respectively. The video encoders 114 can be tuned using different parameter configurations of the GOP size 118 and the SC threshold 120 to select I-frames without impacting recognition performance of the MEC object recognizers 108 and the CC object recognizer 112.

Figure 13:
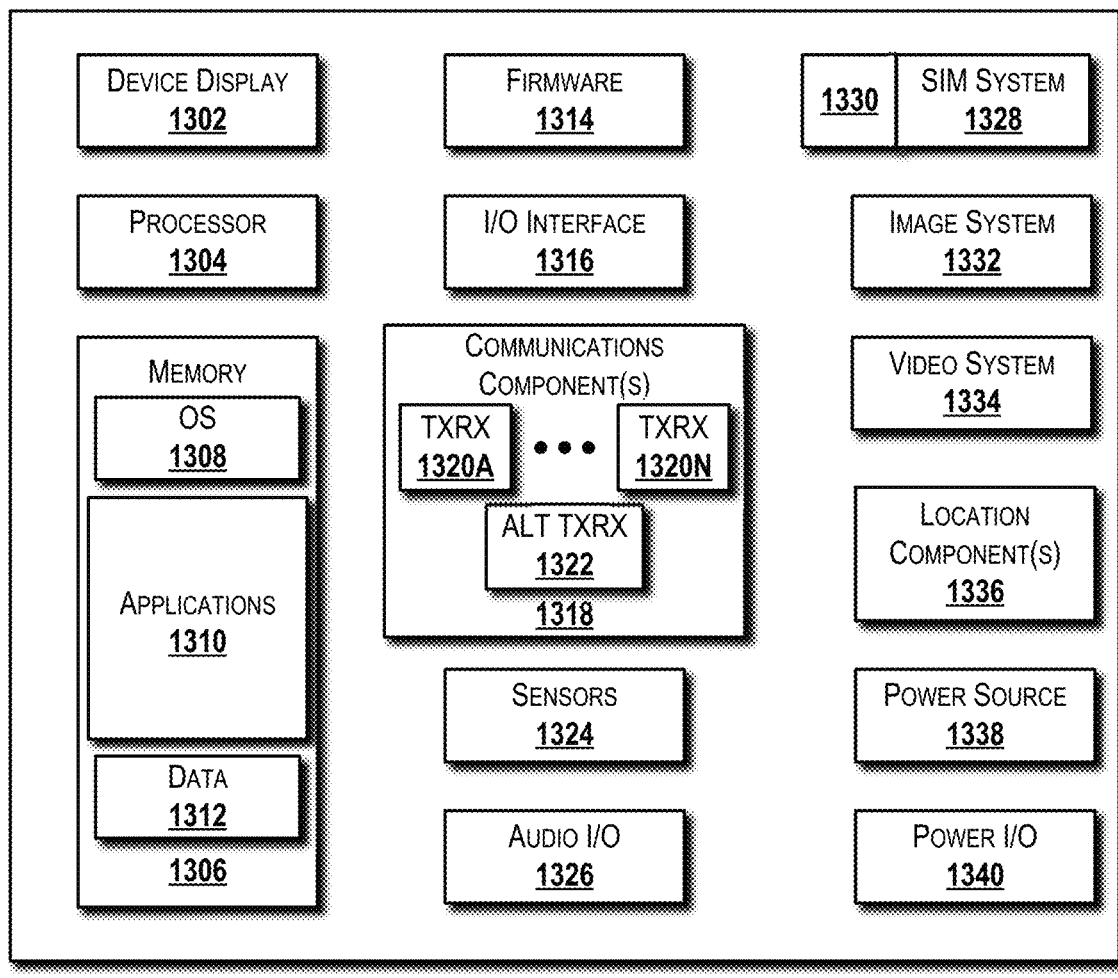
FIG. 13 is a block diagram illustrating an example mobile device, according to an illustrative embodiment.

The mobile telecommunications network 102 can be a single network or a combination of multiple networks that utilize any wireless communications technology or combination of wireless communications technologies to provide wireless communications capabilities to the cameras 104 and, in some implementations, other devices such as Internet of things ("IoT") devices, smartphones and other mobile devices (an example of which is shown in FIG. 13). The mobile telecommunications network 102 may operate in accordance with one or more mobile telecommunications standards, including, but not limited to, Global System for Mobile communications ("GSM"), Code Division Multiple Access ("CDMA") ONE, CDMA2000, Universal Mobile Telecommunications System ("UMTS"), Long-Term Evolution ("LTE"), LTE-Advanced ("LTE-A"), Worldwide Interoperability for Microwave Access ("WiMAX"), other 802.XX technologies, and/or the like. Moreover, the mobile telecommunications network 102 can include one or more radio access networks ("RANs") that provide an air interface over which the cameras 104 (and potentially other devices) can communicate with the mobile telecommunications network 102. The RAN(s) may utilize various channel access methods (which may or may not be used by the aforementioned standards), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like to provide the radio/air interface to devices. Data communications can be provided in part by the RAN(s) using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, the RAN(s) may be a GSM RAN ("GRAN"), a GSM EDGE RAN ("GERAN"), a UMTS Terrestrial Radio Access Network ("UTRAN"), an evolved U-TRAN ("E-UTRAN"), any combination thereof, and/or the like.

Each of the cameras 104 can be configured to capture video (utilizing any image capturing technology). For example, the cameras 104 may use sensors embodied as one or more charge coupled device ("CCD") image sensors and/or one or more complementary metal oxide semiconductor ("CMOS") image sensors to capture video. Those skilled in the art will appreciate the numerous configuration the cameras 104 may have and the effects of the configurations on the captured video. The concepts and technologies disclosed herein are not limited to any particular camera technology or configuration thereof. Moreover, the type of video is inconsequential to the implementation of the concepts and technologies disclosed herein, and therefore the examples provided herein, such as traffic surveillance cameras, security cameras, dashboard cameras for vehicles, and the like, should not be construed as being limiting in any way.

Each of the cameras 104 includes the video encoder 114. The video encoder 114 can be implemented in hardware or software. The video encoders 114 are described herein as software encoders, although those skilled in the art will appreciate hardware implementations that may be more suitable for certain deployments of the cameras 104. The video encoders 114 can utilize any video coding format that incorporates I-frames, some examples of which include, but are not limited to, H.264 Advanced Video Coding ("AVC") and H.265 High Efficiency Video Coding ("HEVC"). It should be understood that other video coding formats that utilize I-frames or similar concepts are contemplated, and as such, the video encoders 114 should not be construed as being limited to only H.264 and H.265. The video encoders 114 can be tuned using different video encoding parameter configurations, including different configurations of values for the GOP size 118 and the SC threshold 120 parameters, to select I-frames for the encoded video 116 without impacting performance of the MEC object recognizers 108 and the CC object recognizer 112. Briefly, the video encoder 114 can calculate a similarity metric for every frame to estimate how different that frame is from the previous frame. If the value calculated by the video encoder 114 is lower than the SC threshold 120, a new GOP can be created along with a new initial I-frame for the new GOP. An example method for selecting a best encoding parameter configuration for the video encoder 114 is described herein below with reference to FIG. 6. It should be understood that the best encoding parameter configuration may be determined in accordance with the method 1100 described in FIG. 11, although, in some implementations, other factors may influence the values of the GOP size 118 and/or the SC threshold 120 parameters that are best-suited for those implementations.

Traditional video encoders are tuned for compression ratio and speed. The video encoders 114 described herein forgo this approach in favor tuning the GOP size 118 and the SC threshold 120 to produce I-frames only when an event occurs. An "event" is an occurrence of something of interest in a video captured by one of the cameras 104. An event may be, for example, an object entering or leaving a scene (i.e., an object recognition task), or an object changing position within a scene (i.e., an object detection task). More particularly, by way of example, and not limitation, an event could be detecting a road sign in a scenario where the camera 104 is deployed in a vehicle, or detecting a traffic jam in another scenario where the camera 104 is deployed as a traffic surveillance camera or stop light camera. The video encoders 114 can be tuned for each type of event. For example, the task of detecting roads signs may require the video encoder 114 to be tuned to generate an I-frame every second if a vehicle is moving, but only one I-frame per hour when the vehicle is parked. Similarly, for example, the video encoder 114 of a traffic surveillance camera may be tuned to produce frequent I-frames (e.g., one I-frame/second) during rush hour(s) and fewer I-frames during other travel times.

In the illustrated example, the MEC network$_1$ 106A and the MEC network$_n$ 106N, each of which operate at the edge of the mobile telecommunications network 102, enable on-demand elastic access to and/or other interaction(s) with a shared pool of reconfigurable resources shown as MEC resources₁ 122A for the MEC network₁ 106A and MEC resourcesₙ 122N for the MEC networkₙ 106N (hereinafter, at times, referred to individually as "MEC resource 122," or collectively as "MEC resources 122"). The MEC resources 122 can include any hardware and/or software resources and/or virtualizations thereof utilized by the MEC networks 106A, 106N to deploy and operate the MEC object recognizers 108A, 108N in MEC neural networks 124A, 124N deployed within MEC deep learning containers 126A, 126N (hereinafter, at times, referred to individually as "MEC deep learning container 126," or collectively as "MEC deep learning containers 126"), respectively. The MEC resources 122 can be provided as part of a cloud computing platform upon which the MEC networks 106 are built. An illustrative example of a cloud computing environment suitable for such implementations is described herein below with reference to FIG. 15. It should be understood, however, that the specific configuration of a cloud computing platform can be selected based upon the requirements of a specific implementation of the MEC networks 106, the MEC resources 122, the MEC neural networks 124, and the MEC deep learning containers 126. As such, any specific configuration of a cloud computing platform disclosed herein is provided merely as example and should not be construed as being limiting in any way.

Also in the illustrated example, the CC network 110 enables on-demand elastic access to and/or other interaction(s) with a shared pool of reconfigurable resources shown as CC resources 128. The CC resources 128 can include any hardware and/or software resources and/or virtualizations thereof utilized by the CC network 110 to deploy and operate the CC object recognizer 112 in a CC neural network 130 deployed within a CC deep learning container 132. The CC resources 128 can be provided as part of a cloud computing platform upon which the CC network 110 is built, such as the implementation of an example cloud computing environment described herein below with reference to FIG. 15. It should be understood, however, that the specific configuration of a cloud computing platform can be selected based upon the requirements of a specific implementation of the CC network 110, the CC resources 128, the CC neural network 130, and the CC deep learning container 132. As such, any specific configuration of a cloud computing platform disclosed herein is provided merely as example and should not be construed as being limiting in any way.

The MEC neural networks 124 and the CC neural network 130 can utilize any neural network topology. Those skilled in the art will appreciate the benefits of different neural network topologies for particular implementations, and as such, the requirements of a given implementation can be considered when selecting the topology to be used for the MEC neural networks 124 and the CC neural network 130. Moreover, it should be understood that the study of neural networks is expected to continue for years to come, and as such, the concepts and technologies disclosed herein should not be construed as being limited to any current neural network technologies and topologies.

The MEC deep learning containers 126 and the CC deep learning container 132 can contain a Docker image that includes a deep learning framework, such as Scikit Learn, Tensor Flow, H20, or the like, to implement a machine learning environment in which to execute the MEC object recognizers 108 and the CC object recognizer 112, respectively. Pre-configured Docker containers available from one or more vendors and proprietary Docker containers are contemplated as possible implementations of the MEC deep learning containers 126 and the CC deep learning container 132. The MEC object recognizers 108 and the CC object recognizer 112 are configured to find real-world objects from the encoded videos 116 based upon one or more object models (not shown).

Object recognition provided, in part, by the MEC neural networks 124 via the MEC object recognizers 108 and, in part, by the CC neural network 130 via the CC object recognizer 112 can be represented as a sequence (also referred to herein as a pipeline) of operations, wherein the output of one operation is provided as input to the next operation in the sequence. The operations of the sequence can include any operations needed for object recognition, including convolution operations, pooling operations, a matrix multiplication operations, and/or other operations as needed for a particular implementation.

Figure 2:
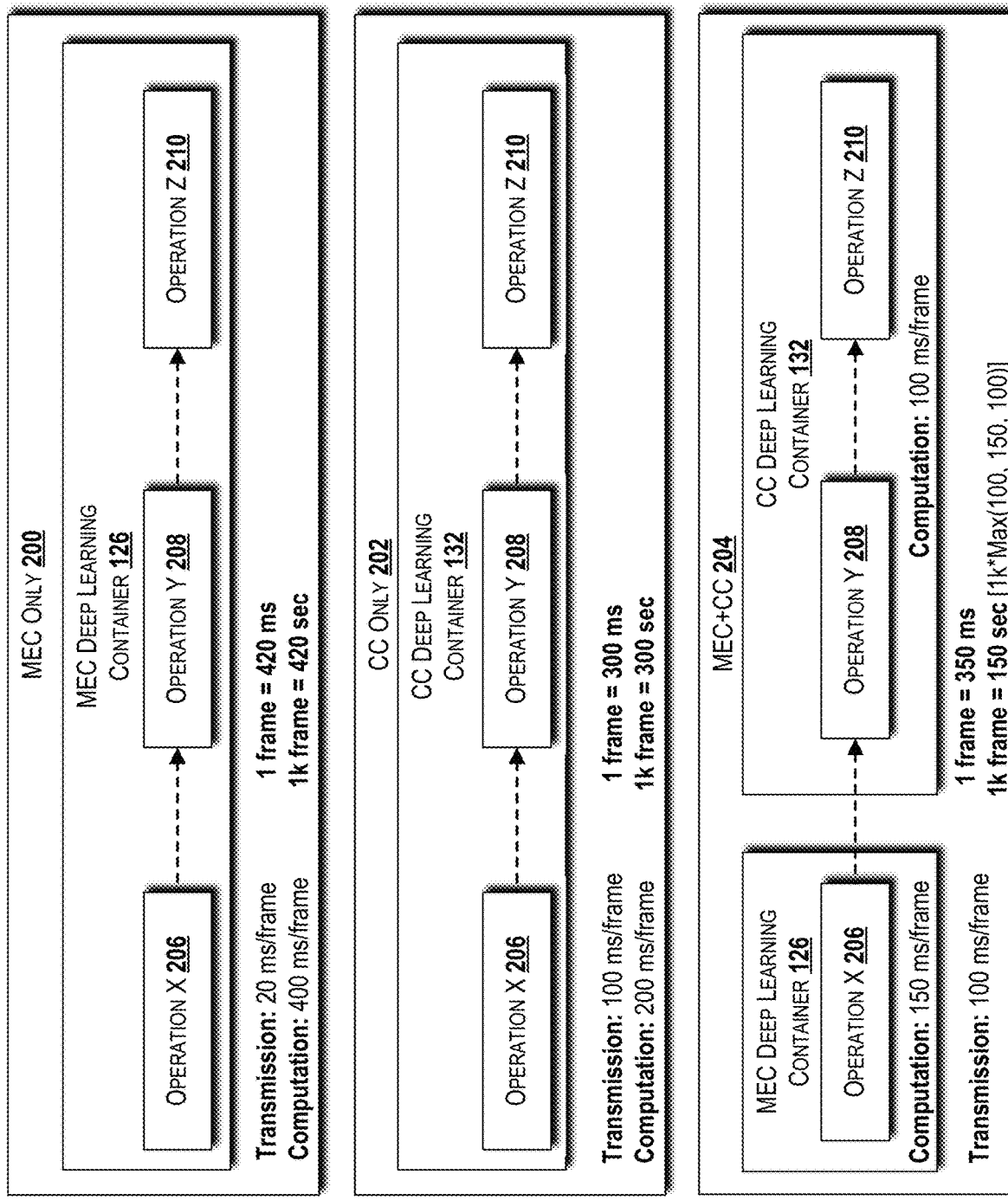
FIG. 2 is a block diagram illustrating a comparison between different neural network deployments, including a mobile edge cloud ("MEC")-only deployment, a central cloud ("CC")-only deployment, and a partitioned deployment with partitions for both a MEC deployment and a CC deployment, according to an illustrative embodiment.

Turning now to FIG. 2, a block diagram illustrating a comparison between different neural network deployments, including an MEC-only deployment 200, a CC-only deployment 202, and a partitioned deployment 204 with partitions for both an MEC deployment and a CC deployment will be described, according to an illustrative embodiment. The MEC-only deployment 200 illustrates the MEC deep learning container 126 deployed at the edge of the mobile telecommunications network 102 in the MEC network 106.

In the illustrated example of the MEC-only deployment 200, the MEC deep learning container 126 contains three operations—operation X 206, operation Y 208, and operation Z 210—that are executed in sequence. For the MEC-only deployment 200, the transmission time per frame of the encoded video 116 is 20 milliseconds ("ms") and the computation time per frame is 400 ms. Thus, for each frame of the encoded video 116, the MEC-only deployment 200 takes 420 ms or 420 seconds per 1000 frames.

In the illustrated example of the CC-only deployment 202, the CC deep learning container 132 contains the operation X 206, the operation Y 208, and the operation Z 210 that are executed in sequence. For the CC-only deployment 202, the transmission time per frame of the encoded video 116 is 100 ms and the computation time per frame is 200 ms. Thus, for each frame of the encoded video 116, the CC-only deployment 202 takes 300 ms or 300 seconds per 1000 frames.

In the illustrated example of the partitioned deployment 204, the MEC deep learning container 126 contains the operation X 206 and the CC deep learning container 132 contains the operation Y 208 and the operation Z 210. Transmission time per frame of the encoded video 116 is 100 ms. Computation time per frame of the encoded video 116 is 150 ms at the MEC partition and 100 ms at the CC partition. Thus, for each frame of the encoded video 116, the partitioned deployment 204 takes 350 ms or 150 seconds per 1000 frames—that is, [1000*Max(100, 150, 100)]. The partitioned deployment 204 therefore improves significantly upon the MEC-only deployment 200 (150 sec/1000 frames vs. 420 sec/1000 frames) and the CC-only deployment 202 (300 sec/1000 frames).

Figure 3:
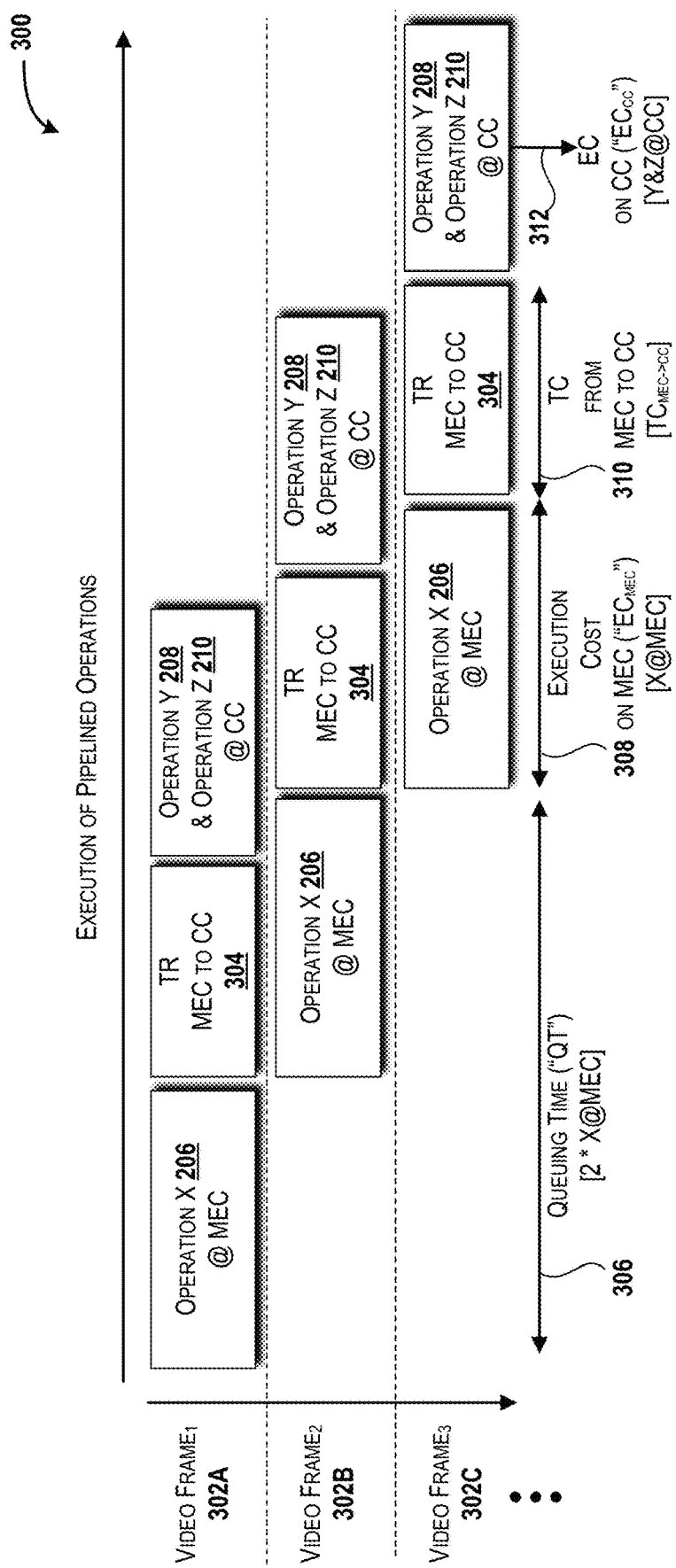
FIG. 3 is a diagram illustrating the execution of pipelined operations in a partitioned deployment, according to an illustrative embodiment.

Turning now to FIG. 3, a diagram illustrating an example execution of pipelined operations (shown generally as 300) in the partitioned deployment 204 will be described, according to an illustrative embodiment. The illustrated example shows three video frames—video frame₁ 302A, video frame₂ 302B, and video frame₃ 302C—to be processed by the partitioned deployment 204 via execution of pipelined operations, including the operation X 206, the operation Y 208, and the operation Z 210. In particular, the video frame₁ 302A is processed via the operation X 206 at the MEC network 106, followed by transmission (shown generally as 304) from the MEC network 106 to the CC network 110, and then processed via the operation Y 208 and the operation Z 210 at the CC network 110. The video frame$_2$ 302B is processed via the operation X 206 at the MEC network 106, which is queued after the first instance of the operation X 206 with respect to processing the video frame$_1$ 302A, followed by transmission (shown generally as 304) from the MEC network 106 to the CC network 110, and then processed via the operation Y 208 and the operation Z 210 at the CC network 110. The video frame$_3$ 302C is processed via the operation X 206 at the MEC network 106, which is queued after the first and second instances of the operation X 206 with respect to processing the video frame$_1$ 302A and the video frame$_2$ 302B, followed by transmission (shown generally as 304) from the MEC network 106 to the CC network 110, and then processed via the operation Y 208 and the operation Z 210 at the CC network 110.

The illustrated example also shows the cost, in terms of time (e.g., seconds), associated with the execution of pipelined operations. In the illustrated example, a queuing time ("QT") 306 for the video frame$_3$ 302C is shown as two times an execution cost of the operation X 206 at the MEC network 106 (shown as "$EC_{MEC}$" 308). A transmission cost (shown as "$TC_{MEC \rightarrow CC}$" 310) for transmitting the video frames 302C from the MEC network 106 to the CC network 110, and an execution cost on the CC network 110 (shown as "$EC_{MEC}$" 312). The total latency for N video frames therefore can be calculated by the following equations:

Total Latency for $N$ Video Frames=$(N \times QT)$+
$TC_{MEC \rightarrow CC}$+$EC_{CC}$ (Equation 1)

For large $N$: Total Latency for $N$ Video Frames=$(N \times EC_{MEC})$ (Equation 2)

Turning now to FIGS. 4A-4E, diagrams illustrating different partitioning schemes 400A-400E for the partitioned deployment 204 will be described, according to an illustrative embodiment. The partitioning schemes 400A-400E each illustrate a cutting point ("CP") 402 that represents a demarcation between the MEC network 106 and the CC network 110. Each of the operation X 206, the operation Y 208, the operation Z 210, an operation L 212, and an operation M 214 can be profiled separately once for the MEC network 106 and once for the CC network 110. A latency ("latency$_p$") can be computed for each of the cutting points 402. The partitioning scheme 400 that has the lowest value for the latency$_p$ can be determined to be the best partitioning scheme for the partitioned deployment 204. The best partitioning scheme can be represented by the following equation:

$p^*$=argmin(latency$_p$) (Equation 3)

Figure 4A:
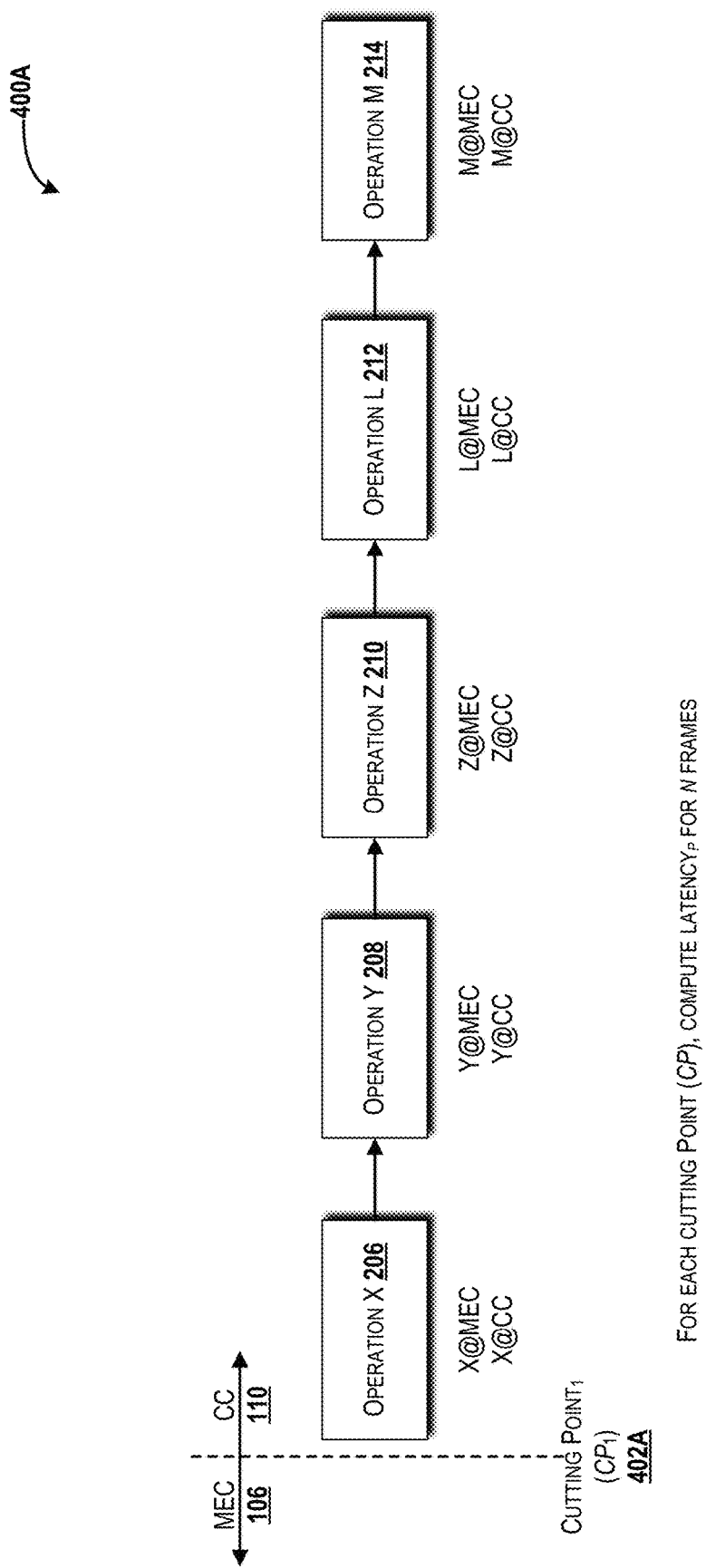
FIGS. 4A-4E are block diagrams illustrating different partitioning schemes for the partitioned deployment, according to an illustrative embodiment.

FIG. 4A shows a first partitioning scheme 400A, wherein a first cutting point ("CP$_1$") 402A is shown before the operation X 206. The first partitioning scheme 400A shows no operations to be executed on the MEC network 106 and all operations, including the operation X 206, the operation Y 208, the operation Z 210, the operation L 212, and the operation M 214, to be executed on the CC network 110.

Figure 4B:
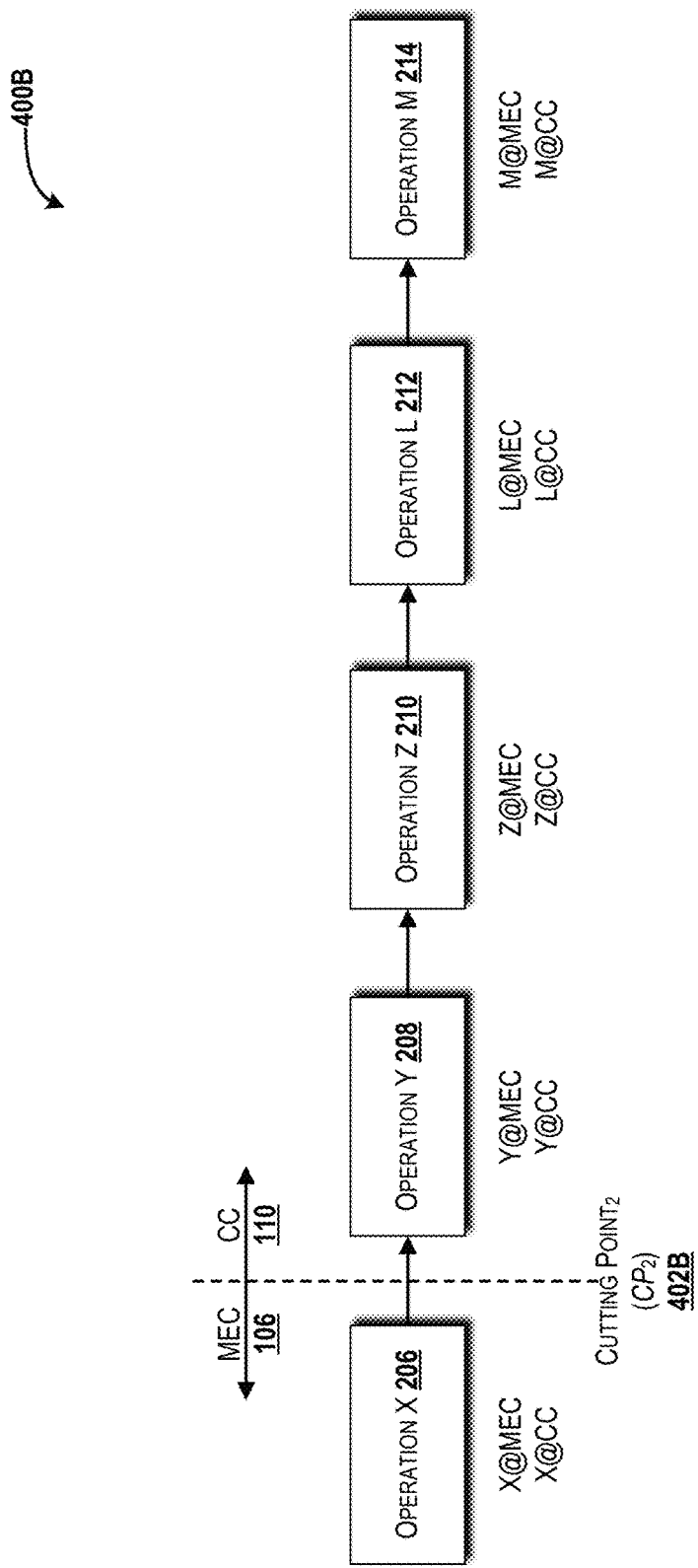

FIG. 4B shows a second partitioning scheme 400B, wherein a second cutting point ("CP$_2$") 402B is shown after the operation X 206. The second partitioning scheme 400B shows the operation X 206 to be executed on the MEC network 106 and the remaining operations, including the operation Y 208, the operation Z 210, the operation L 212, and the operation M 214 to be executed on the CC network 110.

Figure 4C:
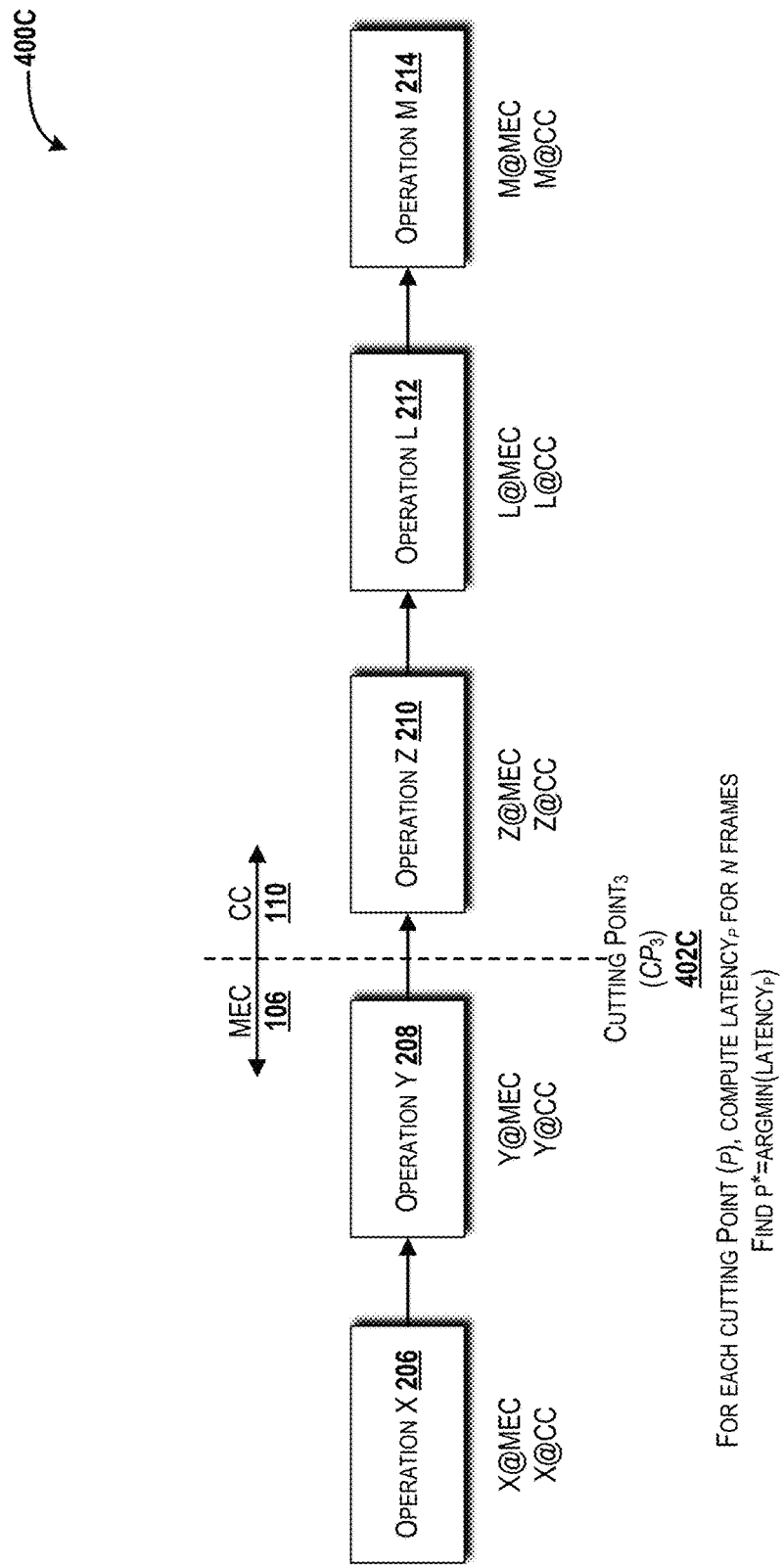

FIG. 4C shows a third partitioning scheme 400C, wherein a third cutting point ("CP$_3$") 402C is shown after the operation Y 208. The third partitioning scheme 400C shows the operation X 206 and the operation Y 208 to be executed on the MEC network 106 and the remaining operations, including the operation Z 210, the operation L 212, and the operation M 214 to be executed on the CC network 110.

Figure 4D:
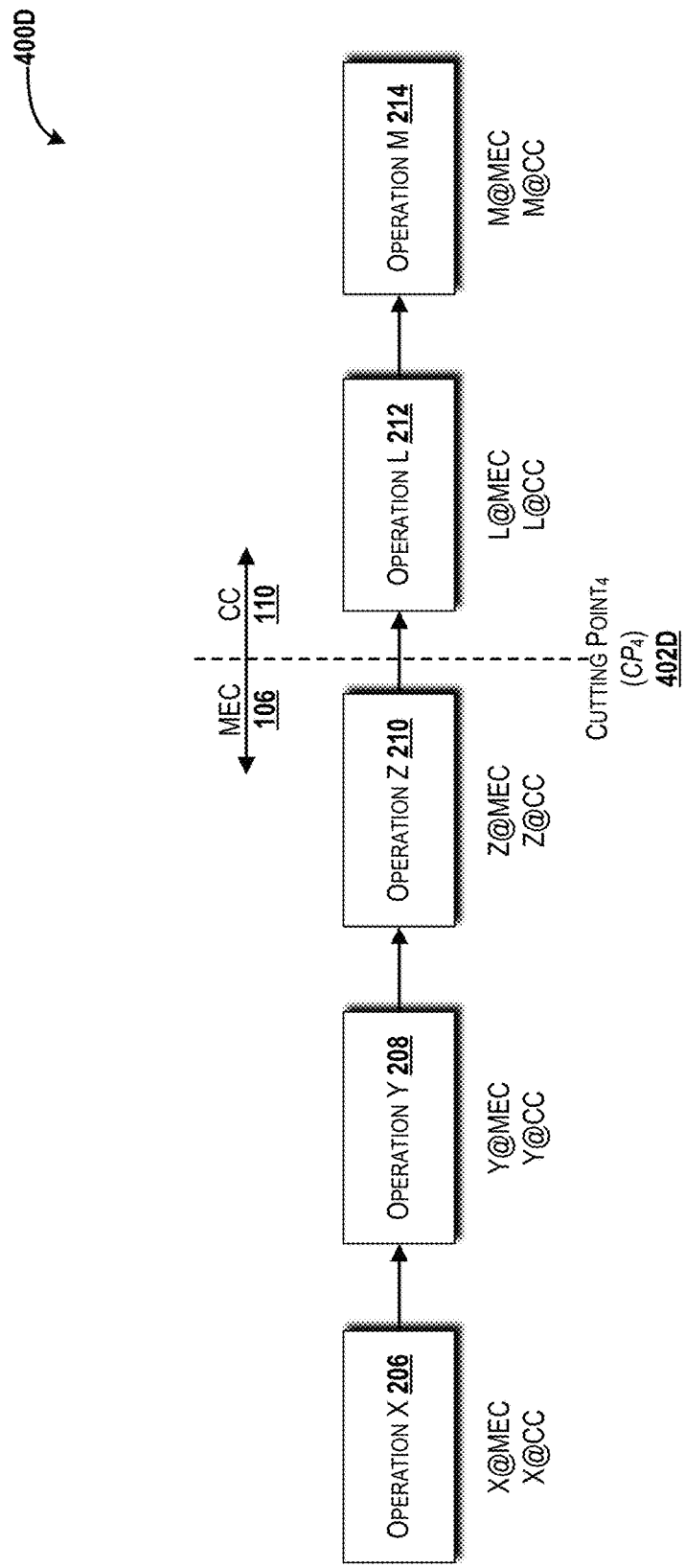

FIG. 4D shows a fourth partitioning scheme 400D, wherein a fourth cutting point ("CP$_4$") 402D is shown after the operation Z 210. The fourth partitioning scheme 400D shows the operation X 206, the operation Y 208, and the operation Z 210 to be executed on the MEC network 106 and the remaining operations, including the operation L 212, and the operation M 214 to be executed on the CC network 110.

Figure 4E:
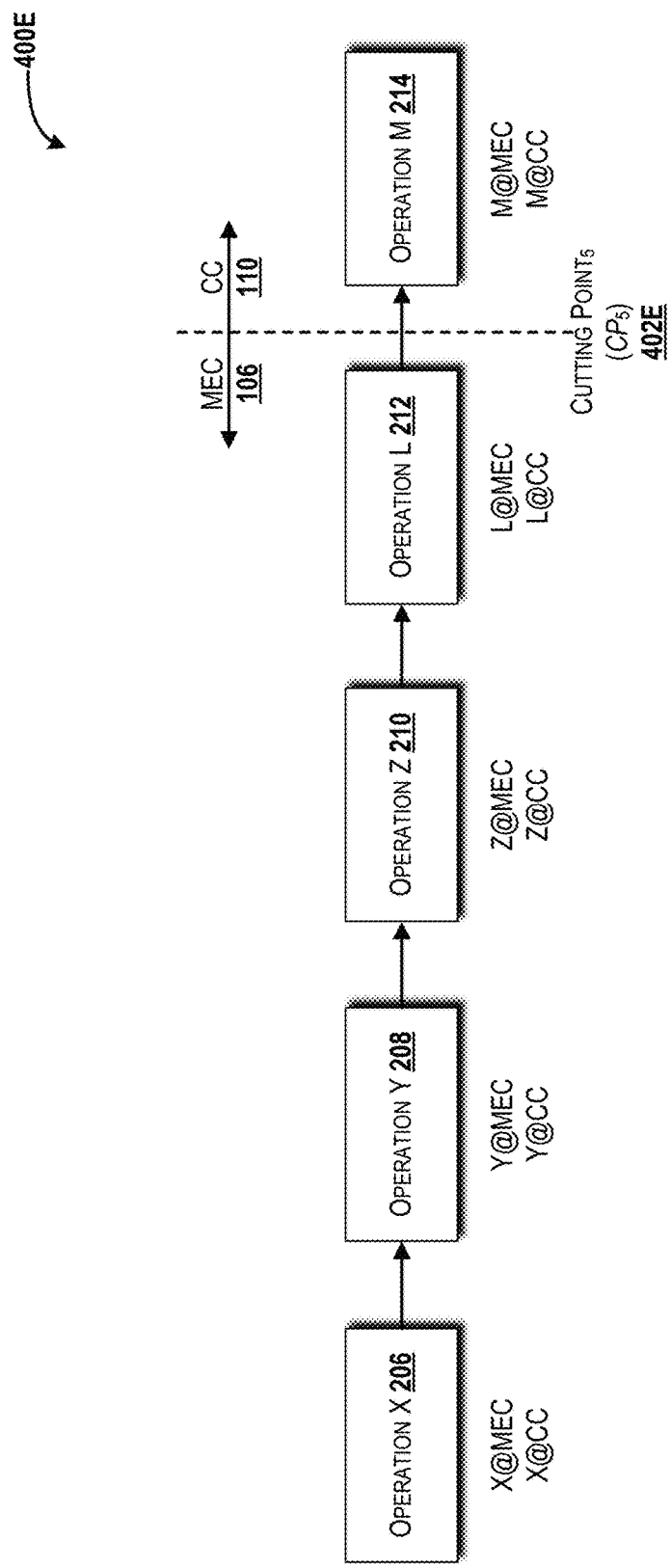

FIG. 4E shows a fifth partitioning scheme 400E, wherein a fifth cutting point ("CP$_5$") 402E is shown after the operation L 212. The fifth partitioning scheme 400E shows the operation X 206, the operation Y 208, the operation Z 210, and the operation L 212 to be executed on the MEC network 106 and the remaining operation—that is, the operation M 214—to be executed on the CC network 110.

Figure 5:
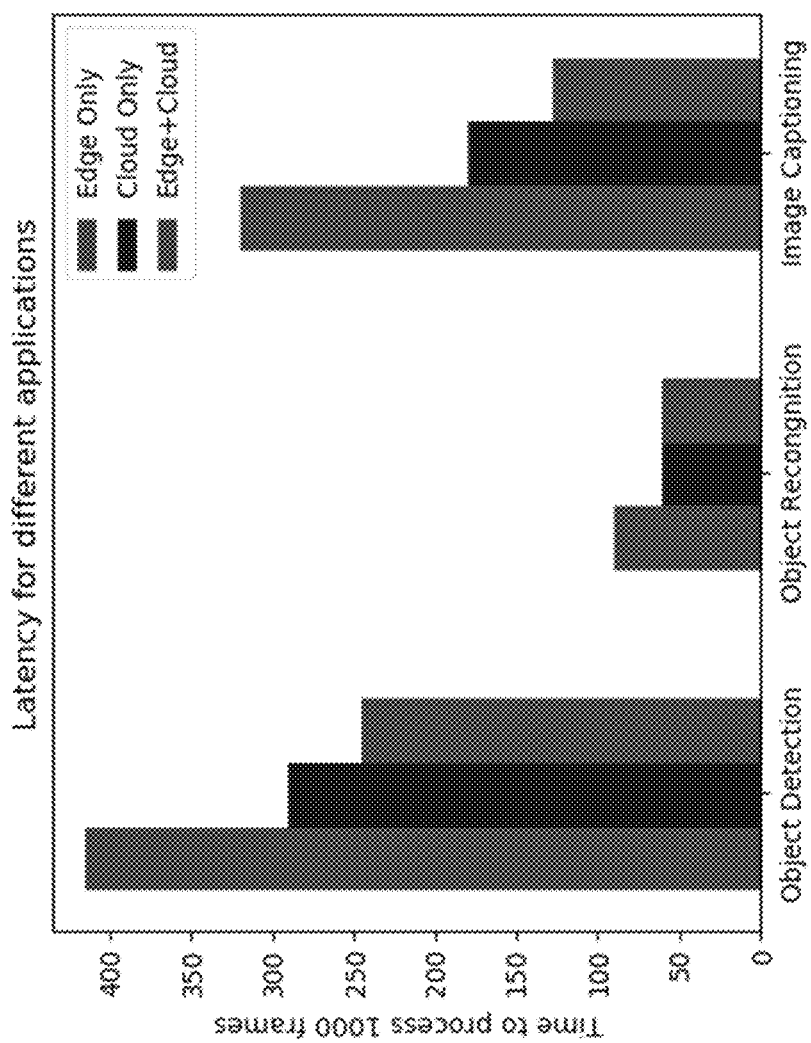
FIG. 5 is an example bar graph illustrating test results of using the different neural network deployments for object detection, object recognition, and image captioning.

Turning now to FIG. 5, an example bar graph 500 illustrating test results of using different neural network deployments for object detection, object recognition, and image captioning. FIG. 5 will be described with additional reference to FIG. 2. The test results demonstrate an improvement of 16%-25% in processing 1000 video frames using the partitioned deployment 204 with partitions for both an MEC deployment and a CC deployment over the MEC-only deployment 200 and the CC-only deployment 202 for object detection and image captioning applications. For object recognition, the portioned deployment 204 does not appear to provide any improvement over the CC-only deployment 202.

Figure 6:
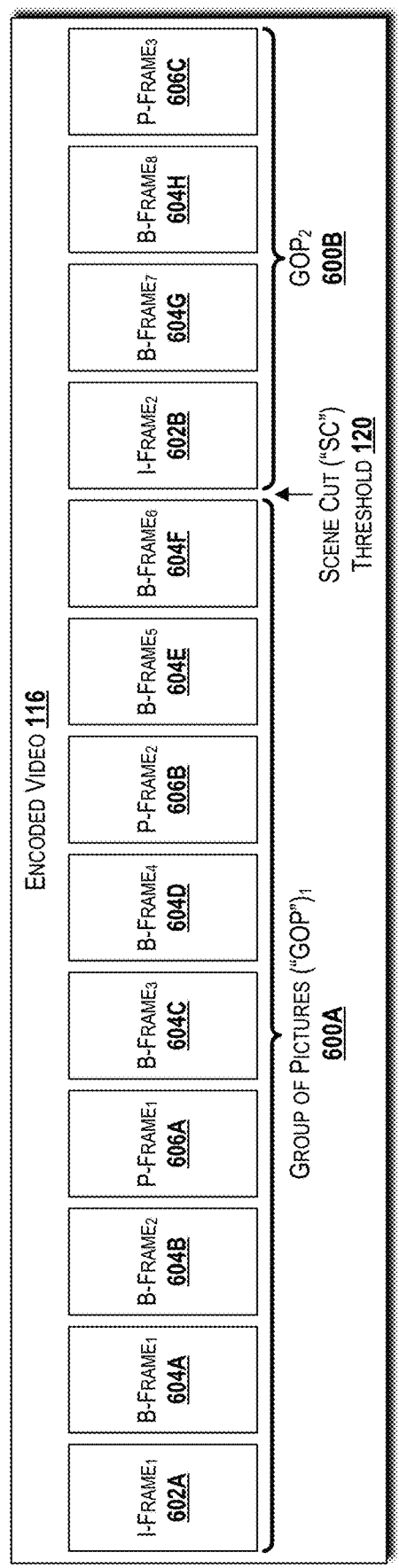
FIG. 6 is a diagram illustrating aspects of an example encoded video.

Turning now to FIG. 6, an example of the encoded video 116 will be described, according to an illustrative embodiment. The illustrated encoded video 116 includes a plurality of video frames divided into a first GOP ("GOP$_1$") 600A and a second GOP ("GOP$_2$") 600B. The first GOP$_1$ 600A is illustrated as having a first I-Frame ("I-Frame$_1$") 602A, a first B-Frame ("B-Frame$_1$") 604A, a second B-Frame ("B-Frame$_2$") 604B, a first P-Frame ("P-Frame$_1$") 606A, a third B-Frame ("B-Frame$_3$") 604C, a fourth B-Frame ("B-Frame$_4$") 604D, a second P-Frame ("P-Frame$_2$") 606B, a fifth B-Frame ("B-Frames") 604E, and a sixth B-Frame ("B-Frame$_6$") 604F. The second GOP$_2$ 600B is illustrated as having a second I-Frame ("I-Frame$_2$") 602B, a seventh B-Frame ("B-Frame$_7$") 604G, an eighth B-Frame ("B-Frames") 604H, and a third P-Frame ("P-Frame$_3$") 606C. A SC threshold 120 is shown to demarcate when a new GOP is to be created, which in the illustrated example, is the GOP$_2$ 600B.

According to one aspect of the concepts and technologies disclosed herein, configurable video encoding parameters, including the GOP size 118 and the SC threshold 120, can be tuned to select a subset of video frames to provide to one or more machine learning-based object recognizers, such as the MEC object recognizer 108 and/or the CC object recognizer 112 (together "object recognizers 108/112"), in consideration of a balance between the number of frames selected and the performance of the object recognizer(s) 108/112. Without these novel features of the concepts and technologies disclosed herein, every video frame would be sent to the object recognizer(s) 108/112. This requires too much bandwidth. The concepts and technologies disclosed herein show that only around 5% of the video frames are required to achieve similar recognition performance as if 100% of the video frames are sent to the object recognizer(s) 108/112. A goal of video encoding parameter tuning is to determine how to select this 5% of frames without impacting object recognition performance.

Figure 7A:
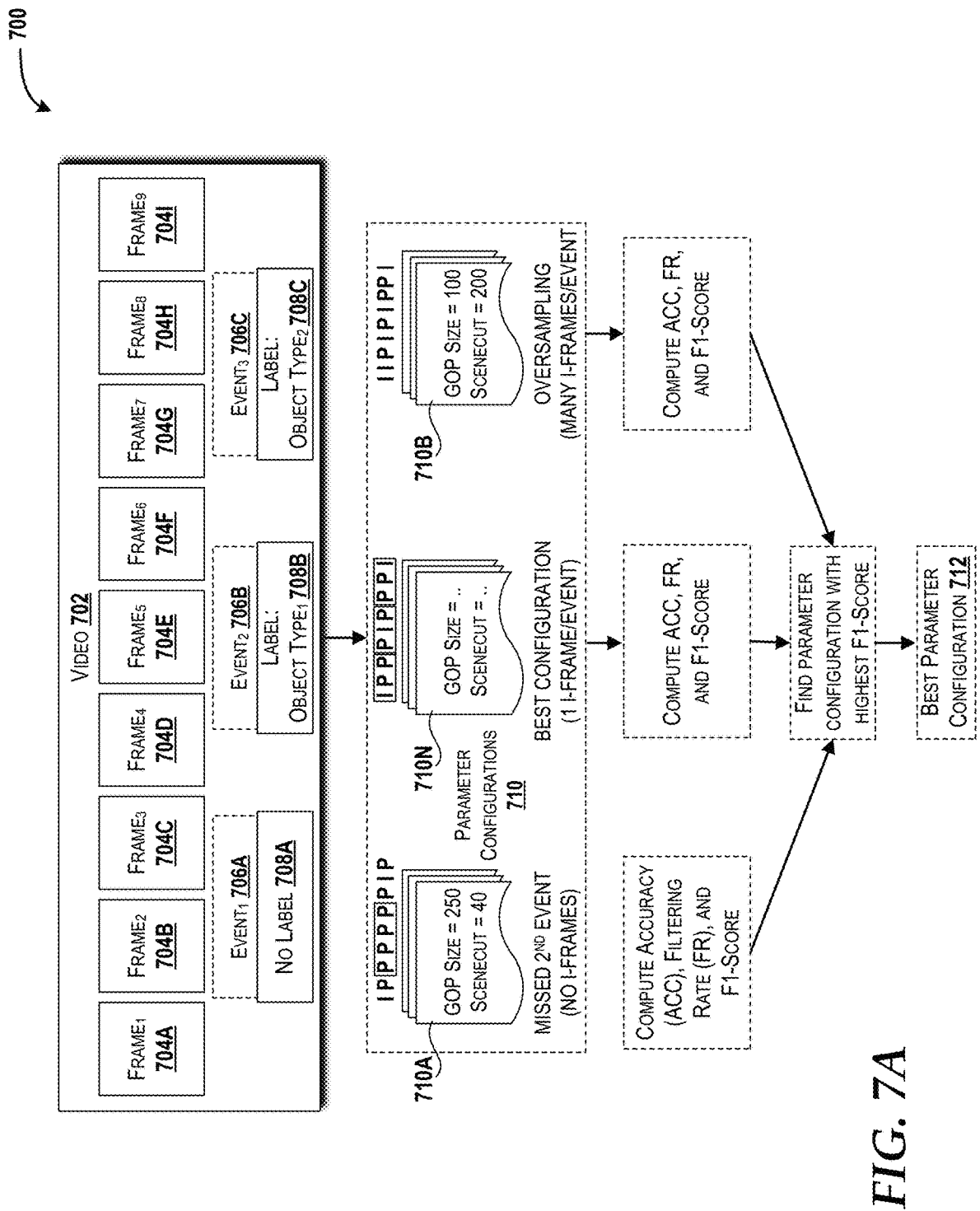
FIG. 7A is a diagram illustrating example steps for finding a best parameter configuration for detecting events in a sample video, according to an illustrative embodiment.

Turning now to FIG. 7A, a diagram illustrating example steps (generally shown as 700) for finding a best video encoder configuration for detecting events in a sample video ("video") 702 will be described, according to an illustrative embodiment. It should be noted that while FIG. 7A is described now, FIG. 7B, which accompanies FIG. 7A and provides additional contextual description, is described later. The illustrated video 702 includes a plurality of video frames 704A-704I, which can be I-Frames, P-Frames, or B-Frames. In this example, the plurality of video frames 704A-704I includes I-Frames and P-Frames only. The video 702 includes three events—a first event ("event$_1$") 706A with no label 708A, a second event ("event$_2$") 706B with a label of object type$_1$ 708B (e.g., a car), and a third event ("event$_3$") 706C with a label of object type$_2$ 708C (e.g., a bus).

After labelled event data is acquired, different parameter configurations 710 for the GOP size 118 and the SC threshold 120 can be tried to determine the best parameter configuration to be used by the video encoder 114 (best shown in FIG. 1) to encode the video 702 to yield the encoded video 116. In the illustrated example, the video encoder 114 can encode the video 702 using a first parameter configuration 710A with the GOP size 118 set to 250 and the SC threshold 120 set to 40 to yield the encoded video 116 without an I-Frame for the event$_2$ 706B, and thus miss the event$_2$ 706B. Also in the illustrated example, the video encoder 114 can encode the video 702 using a second parameter configuration 710B with the GOP size 118 set to 100 and the SC threshold 120 set to 200 to yield the encoded video 116 with multiple I-Frames per event, and thus oversampling. A best parameter configuration 712 for the video encoder 114 utilizes the GOP size 118 and the SC threshold 120 set to values that yield the encoded video 116 with exactly one I-Frame per event.

The best parameter configuration 712 can be found based upon determining which parameter configuration i maximizes the harmonic mean ("F1-score") of accuracy ("ACC") and filtering rate ("FR"), which can be calculated using the following equation:

$$F1-score_i = \frac{(2 \times ACC_i \times FR_i)}{ACC_i + FR_i} \quad \text{(Equation 4)}$$

The best parameter configuration 710N with the highest F1-score is selected by the following equation:

$$i^* = \operatorname{argmin}(F1\text{-}score_i) \quad \text{(Equation 5)}$$

The best parameter configuration 712 with the highest F1-score (as calculated by Equation 5) balances the tradeoff between trying to filter as much redundant information as possible and obtaining a high event detection accuracy. The video encoder 114 can be tuned to the GOP size 118 and the SC threshold 120 of the best parameter configuration 710N to yield this result.

Figures 8A, 8B:
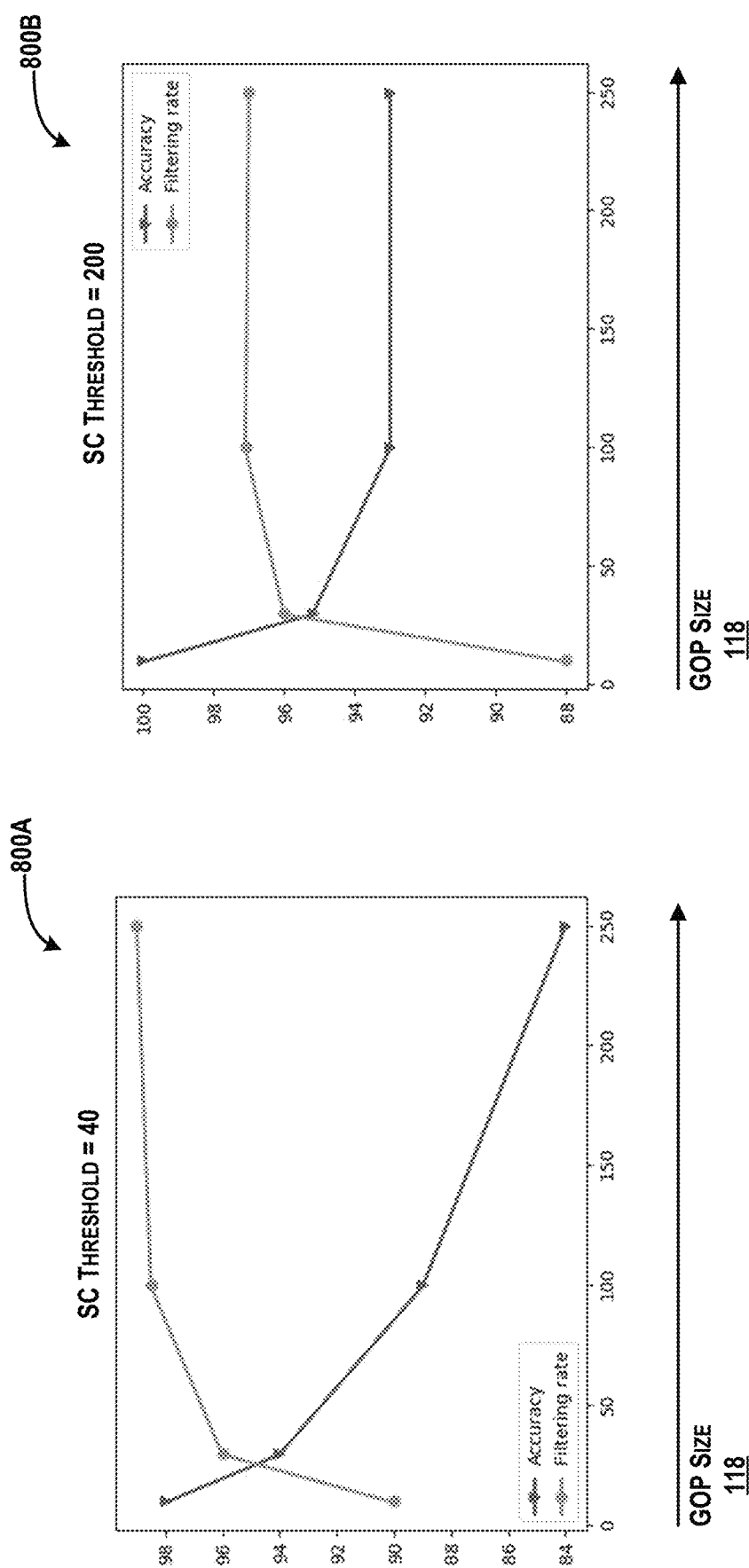
FIGS. 8A and 8B are example line graphs illustrating an accuracy and a filtering rate for different values for a group of pictures ("GOP") size and a scenecut ("SC") threshold, according to an illustrative embodiment.

Turning now to FIGS. 8A and 8B, example line graphs 800A, 800B illustrating an ACC and an FR for different values of the GOP size 118 and the SC threshold 120 are shown. The line graph 800A represents the ACC and the FR with the SC threshold set to 40 with variable GOP sizes 128 up to 250. The line graph 800B represents the ACC and the FR with the SC threshold set to 200 with variable GOP sizes 118 up to 250.

Turning now to FIGS. 9A and 9B, tables 900A, 900B showing example results of using a training data set of 170 videos comprising 50,000 frames and a test data set of 1,900 videos comprising 800,000 frames will be described. In the table 900A, the accuracy of the disclosed approach is shown as 94% versus only 85.6% using a uniform sampling approach (50 fps/sec) that yields an accuracy of 85.6%, both at a sampling rate of 2%. In the table 900B, the compute time for the disclosed approach is shown as 1 ms/frame versus 30 ms/frame for an image similarly approach, and 75 ms/frame for neural network processing on each frame.

As shown in the tables 900A, 900B, the disclosed approach provides a dramatic improvement over existing video encoding technologies. By implementing event detection at the video encoder 114, there is no need to compress video and instead to seek only I-Frames. The disclosed approach is fast because it uses motion information already computed by the video encoder 114. The disclosed approach is efficient because the video encoder 114 can be implemented in hardware, such as part of the camera 104 (best shown in FIG. 1) and/or other hardware in communication with or otherwise associated with the camera 104. Moreover, the disclosed approach is adaptive because it provides more I-Frames when events change rapidly. The disclosed approach offers flexibility to use different parameter configurations for different tasks.

Figure 10:
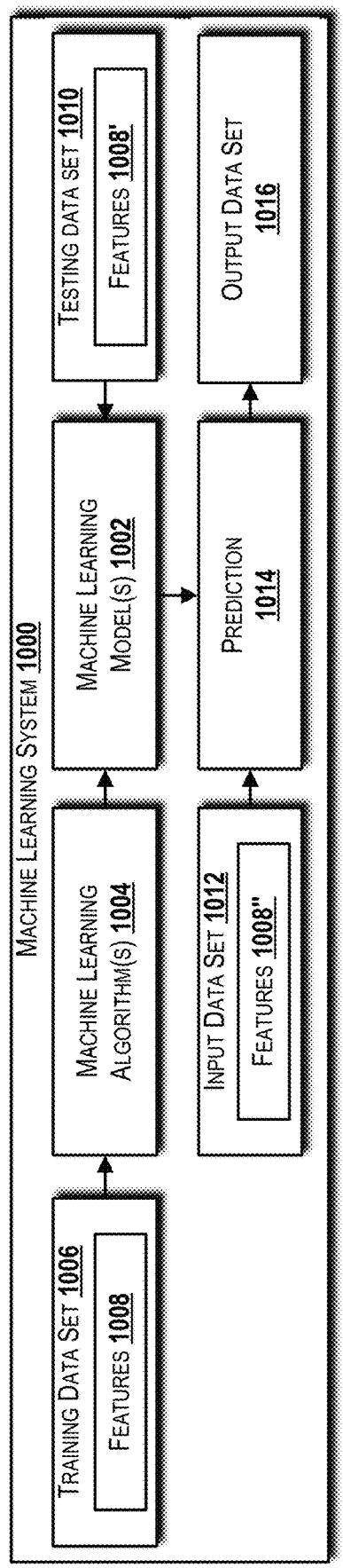
FIG. 10 is a block diagram illustrating a machine learning system capable of implementing aspects of the concepts and technologies disclosed herein.

Turning now to FIG. 10, an illustrative embodiment of a machine learning system 1000 capable of implementing aspects of the embodiments disclosed herein will be described. The MEC object recognizer(s) 108 and the CC object recognizers 112 can be implemented as or part of the machine learning system 1000. The illustrated machine learning system 1000 includes one or more machine learning models 1002. The machine learning model(s) 1002 can be created by the machine learning system 1000 based upon any machine learning algorithm 1004 or combination of machine learning algorithms 1004. It should be understood that the machine learning algorithm(s) 1004 used is not limited to any specific machine learning algorithm 1004 and can be selected based upon the needs of a given implementation. The machine learning algorithm(s) 1004 can be based upon any existing, well-known algorithm, any proprietary algorithms, or any future machine learning algorithm. Some example machine learning algorithms 1004 include, but are not limited to, gradient descent, linear regression, logistic regression, linear discriminant analysis, classification tree, regression tree, Naive Bayes, K-nearest neighbor, learning vector quantization, support vector machines, and the like. Those skilled in the art will appreciate the applicability of various machine learning algorithms 1004 based upon the problem(s) to be solved by machine learning via the machine learning system 1000.

The machine learning system 1000 can control the creation of the machine learning models 1002 via one or more training parameters. In some embodiments, the training parameters are selected by modelers, for example. Alternatively, in some embodiments, the training parameters are automatically selected based upon data provided in one or more training data sets 1006, such as the historic training data set 720 shown in FIG. 7B. The training parameters can include, for example, a learning rate, a model size, a number of training passes, data shuffling, regularization, and/or other training parameters known to those skilled in the art.

The learning rate is a training parameter defined by a constant value. The learning rate affects the speed at which the machine learning algorithm 1004 converges to the optimal weights. The machine learning algorithm 1004 can update the weights for every data example included in the training data set 1006. The size of an update is controlled by the learning rate. A learning rate that is too high might prevent the machine learning algorithm 1004 from converging to the optimal weights. A learning rate that is too low might result in the machine learning algorithm 1004 requiring multiple training passes to converge to the optimal weights.

The model size is regulated by a number of input features ("features") 1008 in the training data set 1006, such as the labelled events 718 in the historic video data 716 of the labelled data set 714. A greater the number of features 1008 yields a greater number of possible patterns that can be determined from the training data set 1006. The model size should be selected to balance the resources (e.g., compute, memory, storage, etc.) needed for training and the predictive power of the resultant machine learning model 1002.

The number of training passes indicates the number of training passes that the machine learning algorithm 1004 makes over the training data set 1006 during the training process. The number of training passes can be adjusted based, for example, on the size of the training data set 1006, with larger training data sets being exposed to fewer training passes in consideration of time and/or resource utilization. The effectiveness of the resultant machine learning model 1002 can be increased by multiple training passes.

Data shuffling is a training parameter designed to prevent the machine learning algorithm 1004 from reaching false optimal weights due to the order in which data contained in the training data set 1006 is processed. For example, data provided in rows and columns might be analyzed first row, second row, third row, etc., and thus an optimal weight might be obtained well before a full range of data has been considered. By data shuffling, the data contained in the training data set 1006 can be analyzed more thoroughly and mitigate bias in the resultant machine learning model 1002.

Regularization is a training parameter that helps to prevent the machine learning model 1002 from memorizing training data from the training data set 1006. In other words, the machine learning model 1002 fits the training data set 1006, but the predictive performance of the machine learning model 1002 is not acceptable. Regularization helps the machine learning system 1000 avoid this overfitting/memorization problem by adjusting extreme weight values of the features 1008. For example, a feature that has a small weight value relative to the weight values of the other features in the training data set 1006 can be adjusted to zero.

The machine learning system 1000 can determine model accuracy after training by using one or more testing data sets 1010, such as the historic testing data set 722, containing the same features 1008' as the features 1008 in the training data set 1006. This also prevents the machine learning model 1002 from simply memorizing the data contained in the training data set 1006. The number of evaluation passes made by the machine learning system 1000 can be regulated by a target model accuracy that, when reached, ends the evaluation process and the machine learning model 1002 is considered ready for deployment.

After deployment, the machine learning model 1002 can perform a prediction operation ("prediction") 1014 with an input data set 1012 having the same features 1008" as the features 1008 in the training data set 1006 and the features 1008' of the testing data set 1010. The results of the prediction 1014 are included in an output data set 1016 consisting of predicted data. The machine learning model 1002 can perform other operations, such as regression, classification, and others. As such, the example illustrated in FIG. 10 should not be construed as being limiting in any way.

Figure 11:
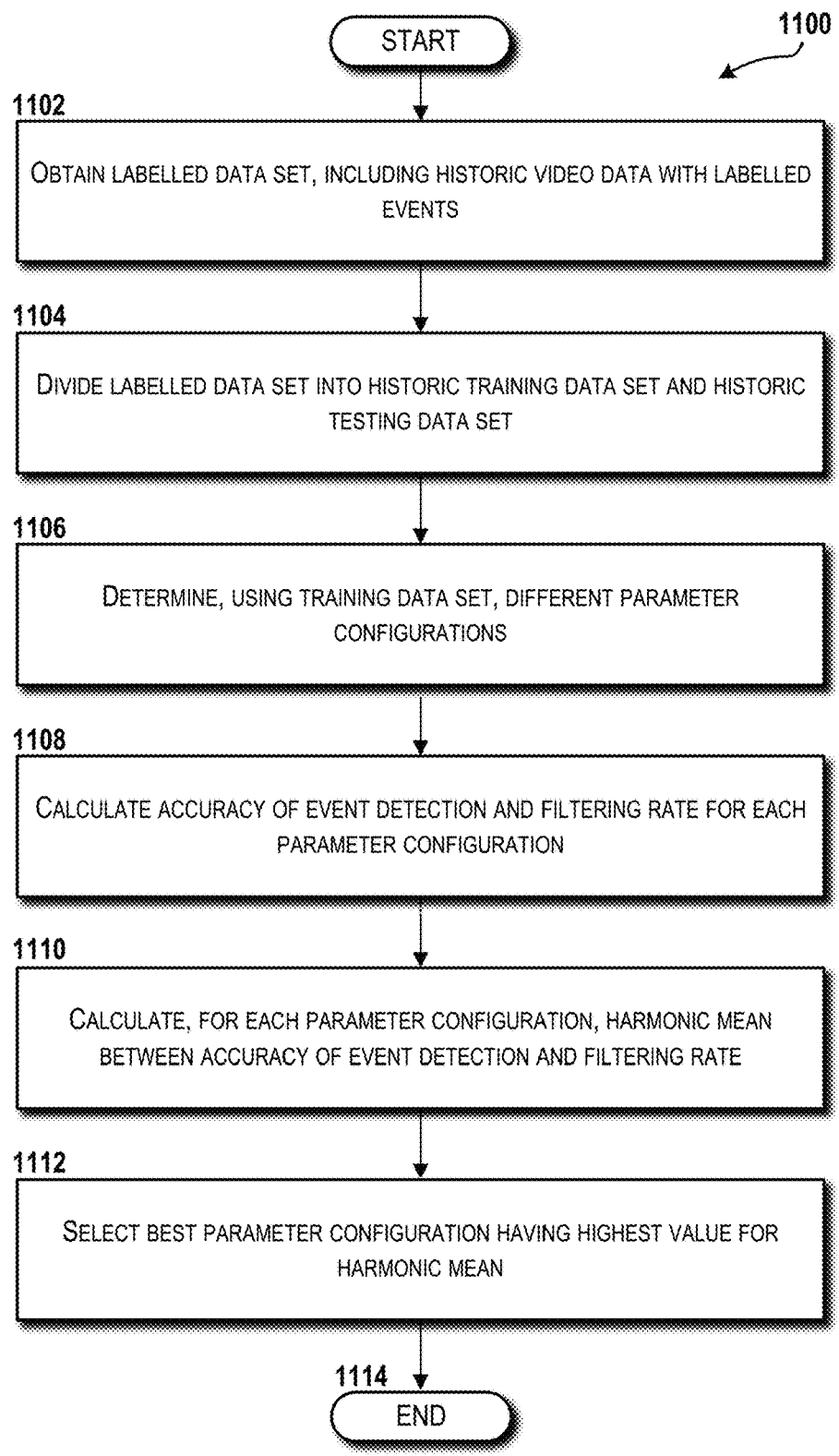
FIG. 11 is a flow diagram illustrating aspects of a method for selecting a best parameter configuration for a video encoder to utilize in choosing a subset of video frames to provide to a machine learning-based object recognizer that balances between the number of frames selected and the performance of the object recognizer, according to an illustrative embodiment.

Turning now to FIG. 11, a flow diagram illustrating aspects of a method 1100 for selecting the best parameter configuration 710N for the video encoder 114 to utilize in choosing a subset of video frames to provide to a machine learning-based object recognizer, such as the MEC object recognizer 108 or the CC object recognizer 112, that balances between the number of frames selected and object recognition performance will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device to perform one or more operations, and/or causing the processor to direct other components of the computing system or device to perform one or more of the operations.

For purposes of illustrating and describing the concepts of the present disclosure, operations of the methods disclosed herein are described as being performed by alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

Figure 7B:
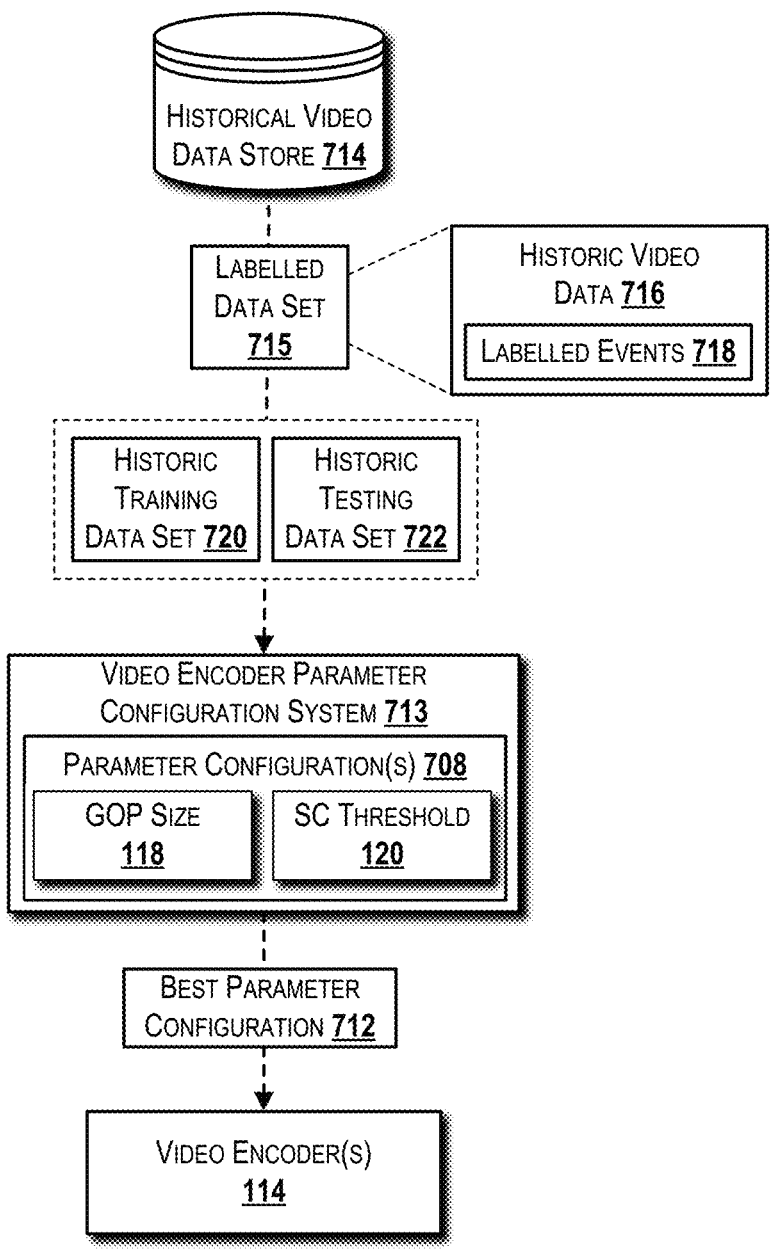
FIG. 7B is a diagram illustrating a video encoder parameter configuration system that determines the best parameter configuration, according to an illustrative embodiment.

The method 1100 will be described with reference to FIG. 7A and FIG. 7B. In particular, the method 1100 will be described as being performed, at least in part, by a video encoder parameter configuration system 713 (best shown in FIG. 7B). The video encoder parameter configuration system 713 can be a standalone computing system, a cloud-based computing system, or any other type of computing system capable of performing, at least in part, the operations of the method 1100. In some embodiments, the video encoder parameter configuration system 713 is configured like a computer system 1200 described herein below with reference to FIG. 12, at least a part of cloud environment 1500 described herein below with reference to FIG. 15, or the machine learning system 1000 described above with reference to FIG. 10.

The method 1100 begins and proceeds to operation 1102, where a labelled data set 715, including historic video data 716 with labelled events 718, is obtained from a historical video data store 714. From operation 1102, the method 1100 proceeds to operation 1104, where the labelled data set 715 is divided into a historic training data set 720 and a historic testing data set 722. For example, 20% of the labelled data set 715 can be allocated to the historic training data set 720 and 80% to the historic testing data set 722.

From operation 1104, the method 1100 proceeds to operation 1106, where the parameter configurations 710 of the GOP size 118 and the SC threshold 120 are determined by the video encoder parameter configuration system 713. In an example experiment performed by the inventors, the GOP size 118 was set to the values: 10, 30, 100, and 250; and the SC threshold 120 was set to the values: 40, 100, 200, 300, and 400. Thus, the total number of the parameter configurations 710 used in the example experiment was 20 (4 GOP sizes*5 SC threshold values). It should be understood that any number of the parameter configurations 710 can be used based upon the needs of a given implementation. As such, the example of 20 different parameter configurations 710 described herein is merely exemplary and should not be construed as being limiting in any way.

From operation 1106, the method 1100 proceeds to operation 1108, where an accuracy of event detection and a filtering rate for each of the parameter configurations 710 is calculated. In particular, every video frame is sent to a neural network (such as the MEC neural network 124, the CC neural network 130, or another neural network used, at least in part, for such calculations) for processing, and the detection result of this approach is used as a baseline. For each parameter configuration 710, the filtering rate can be calculated as a ratio of non-I-frames to total video frames, since only I-frames are sent to be processed (i.e., all non-I-frames are filtered out). The number of objects/events detected by the I-frames used is then compared with the baseline to determine the accuracy rate.

From operation 1108, the method 1100 proceeds to operation 1110, where the harmonic mean ("F1-score") between the accuracy of event detection ("ACC") and the filtering rate ("FR") is calculated for each of the parameter configurations 710 using Equation 4 above. From operation 1110, the method 1100 proceeds to operation 1112, where the best parameter configuration 712 of the parameter configurations 710 is selected based upon the parameter configuration 710 that has the highest F1-score as determined by Equation 5 above. The best parameter configuration 712 with the highest F1-score (as calculated by Equation 5) balances the tradeoff between trying to filter as much redundant information as possible and obtaining a high event detection accuracy. The video encoder 114 can be tuned to the GOP size 118 and the SC threshold 120 of the best parameter configuration 712 to yield this result.

From operation 1112, the method 1100 proceeds to operation 1114. The method 1100 ends at operation 1114.

Figure 12:
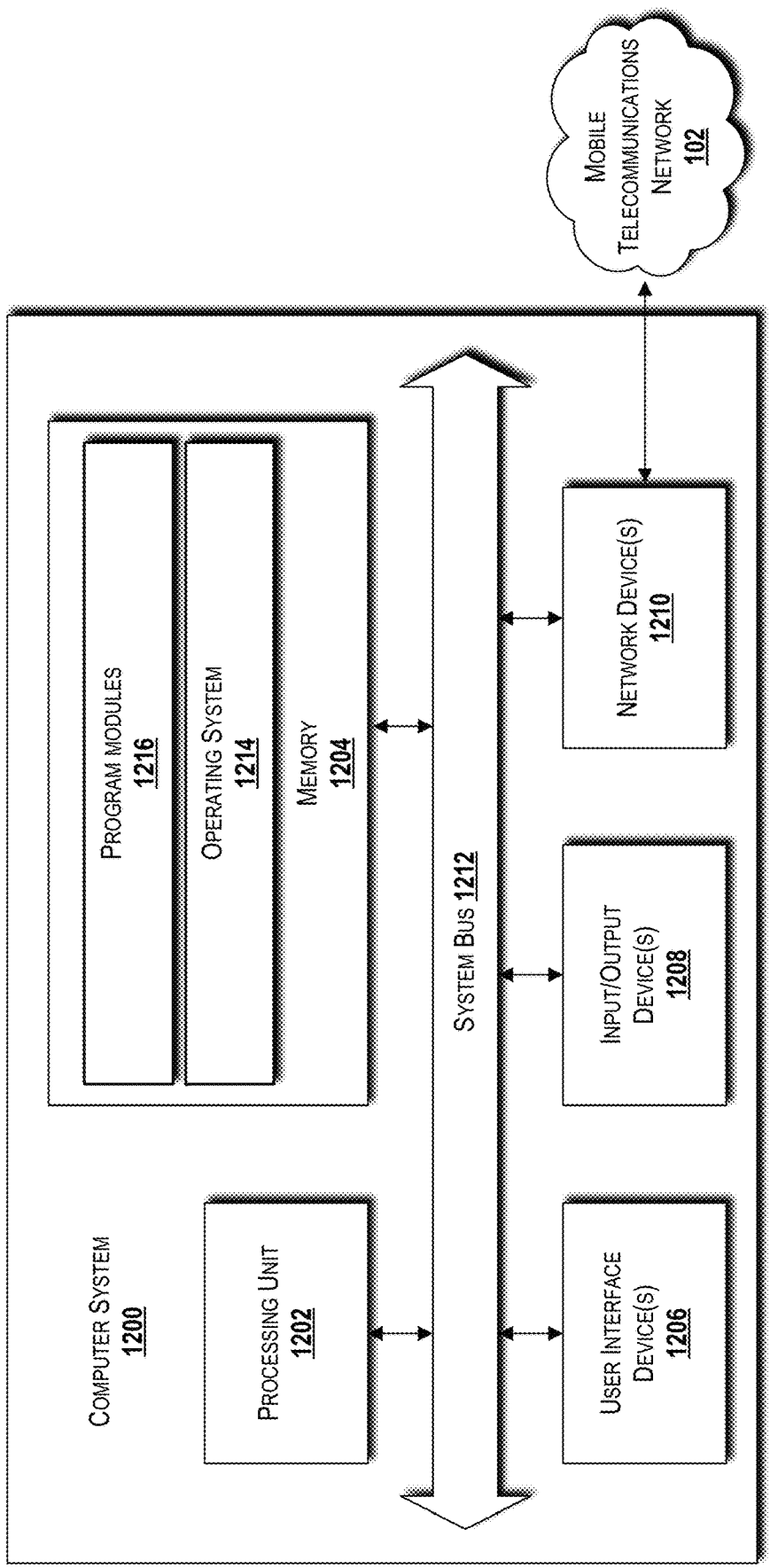
FIG. 12 is a block diagram illustrating an example computer system, according to an illustrative embodiment.

Turning now to FIG. 12, a block diagram illustrating a computer system 1200 configured to provide the functionality described herein in accordance with various embodiments of the concepts and technologies disclosed herein. In some embodiments, one or more elements of the mobile telecommunications network 102, the MEC object recognizer(s) 108, the CC object recognizer 112, and/or the video encoder parameter configuration system 713 can be configured like and/or can have an architecture similar or identical to the computer system 1200 described herein with respect to FIG. 12. It should be understood, however, that any of these systems, devices, or elements may or may not include the functionality described herein with reference to FIG. 12.

The computer system 1200 includes a processing unit 1202, a memory 1204, one or more user interface devices 1206, one or more input/output ("I/O") devices 1208, and one or more network devices 1210, each of which is operatively connected to a system bus 1212. The bus 1212 enables bi-directional communication between the processing unit 1202, the memory 1204, the user interface devices 1206, the I/O devices 1208, and the network devices 1210.

The processing unit 1202 may be a standard central processor that performs arithmetic and logical operations, a more specific purpose programmable logic controller ("PLC"), a programmable gate array, or other type of processor known to those skilled in the art and suitable for controlling the operation of the computer system 1200.

The memory 1204 communicates with the processing unit 1202 via the system bus 1212. In some embodiments, the memory 1204 is operatively connected to a memory controller (not shown) that enables communication with the processing unit 1202 via the system bus 1212. The memory 1204 includes an operating system 1214 and one or more program modules 1216. The operating system 1214 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1216 may include various software and/or program modules described herein. By way of example, and not limitation, computer-readable media may include any available computer storage media or communication media that can be accessed by the computer system 1200. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1200. In the claims, the phrase "computer storage medium," "computer-readable storage medium," and variations thereof does not include waves or signals per se and/or communication media.

The user interface devices 1206 may include one or more devices with which a user accesses the computer system 1200. The user interface devices 1206 may include, but are not limited to, computers, servers, personal digital assistants, cellular phones, or any suitable computing devices. The I/O devices 1208 enable a user to interface with the program modules 1216. In one embodiment, the I/O devices 1208 are operatively connected to an I/O controller (not shown) that enables communication with the processing unit 1202 via the system bus 1212. The I/O devices 1208 may include one or more input devices, such as, but not limited to, a keyboard, a mouse, or an electronic stylus. Further, the I/O devices 1208 may include one or more output devices, such as, but not limited to, a display screen or a printer to output data.

The network devices 1210 enable the computer system 1200 to communicate with other networks or remote systems via one or more networks, such as the mobile telecommunications network 102. Examples of the network devices 1210 include, but are not limited to, a modem, a RF or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such as WiMAX network, or a cellular network. Alternatively, the network(s) may be a wired network such as, but not limited to, a WAN such as the Internet, a LAN, a wired PAN, or a wired MAN.

Turning now to FIG. 13, an illustrative mobile device 1300 and components thereof will be described. While connections are not shown between the various components illustrated in FIG. 13, it should be understood that some, none, or all of the components illustrated in FIG. 13 can be configured to interact with one other to carry out various device functions. In some embodiments, the components are arranged so as to communicate via one or more busses (not shown). Thus, it should be understood that FIG. 13 and the following description are intended to provide a general understanding of a suitable environment in which various aspects of embodiments can be implemented, and should not be construed as being limiting in any way.

As illustrated in FIG. 13, the mobile device 1300 can include a device display 1302 for displaying data. According to various embodiments, the device display 1302 can be configured to display any information. The mobile device 1300 also can include a processor 1304 and a memory or other data storage device ("memory") 1306. The processor 1304 can be configured to process data and/or can execute computer-executable instructions stored in the memory 1306. The computer-executable instructions executed by the processor 1304 can include, for example, an operating system 1308, one or more applications 1310, other computer-executable instructions stored in the memory 1306, or the like. In some embodiments, the applications 1310 also can include a UI application (not illustrated in FIG. 13).

The UI application can interface with the operating system 1308 to facilitate user interaction with functionality and/or data stored at the mobile device 1300 and/or stored elsewhere. In some embodiments, the operating system 1308 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1304 to aid a user in interacting with data. The UI application can be executed by the processor 1304 to aid a user in answering/initiating calls, entering/deleting other data, entering and setting user IDs and passwords for device access, configuring settings, manipulating address book content and/or settings, multimode interaction, interacting with other applications 1310, and otherwise facilitating user interaction with the operating system 1308, the applications 1310, and/or other types or instances of data 1312 that can be stored at the mobile device 1300.

According to various embodiments, the applications 1310 can include, for example, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1310, the data 1312, and/or portions thereof can be stored in the memory 1306 and/or in a firmware 1314, and can be executed by the processor 1304. The firmware 1314 also can store code for execution during device power up and power down operations. It should be appreciated that the firmware 1314 can be stored in a volatile or non-volatile data storage device including, but not limited to, the memory 1306 and/or a portion thereof.

The mobile device 1300 also can include an input/output ("I/O") interface 1316. The I/O interface 1316 can be configured to support the input/output of data. In some embodiments, the I/O interface 1316 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1300 can be configured to synchronize with another device to transfer content to and/or from the mobile device 1300. In some embodiments, the mobile device 1300 can be configured to receive updates to one or more of the applications 1310 via the I/O interface 1316, though this is not necessarily the case. In some embodiments, the I/O interface 1316 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1316 may be used for communications between the mobile device 1300 and a network device or local device.

The mobile device 1300 also can include a communications component 1318. The communications component 1318 can be configured to interface with the processor 1304 to facilitate wired and/or wireless communications with one or more networks, such as the mobile telecommunications network 102. In some embodiments, the communications component 1318 includes a multimode communications subsystem for facilitating communications via the cellular network and one or more other networks.

The communications component 1318, in some embodiments, includes one or more transceivers. The one or more transceivers, if included, can be configured to communicate over the same and/or different wireless technology standards with respect to one another. For example, in some embodiments one or more of the transceivers of the communications component 1318 may be configured to communicate using GSM, CDMAONE, CDMA2000, LTE, and various other 2G, 2.5G, 3G, 4G, 5G and greater generation technology standards. Moreover, the communications component 1318 may facilitate communications over various channel access methods (which may or may not be used by the aforementioned standards) including, but not limited to, TDMA, FDMA, W-CDMA, OFDM, SDMA, and the like.

In addition, the communications component 1318 may facilitate data communications using GPRS, EDGE, the HSPA protocol family including HSDPA, EUL or otherwise termed HSDPA, HSPA+, and various other current and future wireless data access standards. In the illustrated embodiment, the communications component 1318 can include a first transceiver ("TxRx") 1320A that can operate in a first communications mode (e.g., GSM). The communications component 1318 also can include an $N^{th}$ transceiver ("TxRx") 1320N that can operate in a second communications mode relative to the first transceiver 1320A (e.g., UMTS). While two transceivers 1320A-1320N (hereinafter collectively and/or generically referred to as "transceivers 1320") are shown in FIG. 13, it should be appreciated that less than two, two, or more than two transceivers 1320 can be included in the communications component 1318.

The communications component 1318 also can include an alternative transceiver ("Alt TxRx") 1322 for supporting other types and/or standards of communications. According to various contemplated embodiments, the alternative transceiver 1322 can communicate using various communications technologies such as, for example, WI-FI, WIMAX, BLUETOOTH, BLE, infrared, infrared data association ("IRDA"), near field communications ("NFC"), other RF technologies, combinations thereof, and the like.

In some embodiments, the communications component 1318 also can facilitate reception from terrestrial radio networks, digital satellite radio networks, internet-based radio service networks, combinations thereof, and the like. The communications component 1318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1300 also can include one or more sensors 1324. The sensors 1324 can include temperature sensors, light sensors, air quality sensors, movement sensors, orientation sensors, noise sensors, proximity sensors, or the like. As such, it should be understood that the sensors 1324 can include, but are not limited to, accelerometers, magnetometers, gyroscopes, infrared sensors, noise sensors, microphones, combinations thereof, or the like. One or more of the sensors 1324 can be used to detect movement of the mobile device 1300. Additionally, audio capabilities for the mobile device 1300 may be provided by an audio I/O component 1326. The audio I/O component 1326 of the mobile device 1300 can include one or more speakers for the output of audio signals, one or more microphones for the collection and/or input of audio signals, and/or other audio input and/or output devices.

The illustrated mobile device 1300 also can include a subscriber identity module ("SIM") system 1328. The SIM system 1328 can include a universal SIM ("USIM"), a universal integrated circuit card ("UICC") and/or other identity devices. The SIM system 1328 can include and/or can be connected to or inserted into an interface such as a slot interface 1330. In some embodiments, the slot interface 1330 can be configured to accept insertion of other identity cards or modules for accessing various types of networks. Additionally, or alternatively, the slot interface 1330 can be configured to accept multiple subscriber identity cards. Because other devices and/or modules for identifying users and/or the mobile device 1300 are contemplated, it should be understood that these embodiments are illustrative, and should not be construed as being limiting in any way.

The mobile device 1300 also can include an image capture and processing system 1332 ("image system"). The image system 1332 can be configured to capture or otherwise obtain photos, videos, and/or other visual information. As such, the image system 1332 can include cameras, lenses, CCDs, combinations thereof, or the like. The mobile device 1300 may also include a video system 1334. The video system 1334 can be configured to capture, process, record, modify, and/or store video content. Photos and videos obtained using the image system 1332 and the video system 1334, respectively, may be added as message content to an MMS message, email message, and sent to another mobile device. The video and/or photo content also can be shared with other devices via various types of data transfers via wired and/or wireless communication devices as described herein. The video system 1334 can be or can include the camera 104 (shown in FIG. 1).

The mobile device 1300 also can include one or more location components 1336. The location components 1336 can be configured to send and/or receive signals to determine a specific location of the mobile device 1300. According to various embodiments, the location components 1336 can send and/or receive signals from GPS devices, A-GPS devices, WI-FI/WIMAX and/or cellular network triangulation data, combinations thereof, and the like. The location component 1336 also can be configured to communicate with the communications component 1318 to retrieve triangulation data from the mobile telecommunications network 102 for determining a location of the mobile device 1300. In some embodiments, the location component 1336 can interface with cellular network nodes, telephone lines, satellites, location transmitters and/or beacons, wireless network transmitters and receivers, combinations thereof, and the like. In some embodiments, the location component 1336 can include and/or can communicate with one or more of the sensors 1324 such as a compass, an accelerometer, and/or a gyroscope to determine the orientation of the mobile device 1300. Using the location component 1336, the mobile device 1300 can generate and/or receive data to identify its geographic location, or to transmit data used by other devices to determine the location of the mobile device 1300. The location component 1336 may include multiple components for determining the location and/or orientation of the mobile device 1300.

The illustrated mobile device 1300 also can include a power source 1338. The power source 1338 can include one or more batteries, power supplies, power cells, and/or other power subsystems including alternating current ("AC") and/or direct current ("DC") power devices. The power source 1338 also can interface with an external power system or charging equipment via a power I/O component 1340. Because the mobile device 1300 can include additional and/or alternative components, the above embodiment should be understood as being illustrative of one possible operating environment for various embodiments of the concepts and technologies described herein. The described embodiment of the mobile device 1300 is illustrative, and should not be construed as being limiting in any way.

Figure 14:
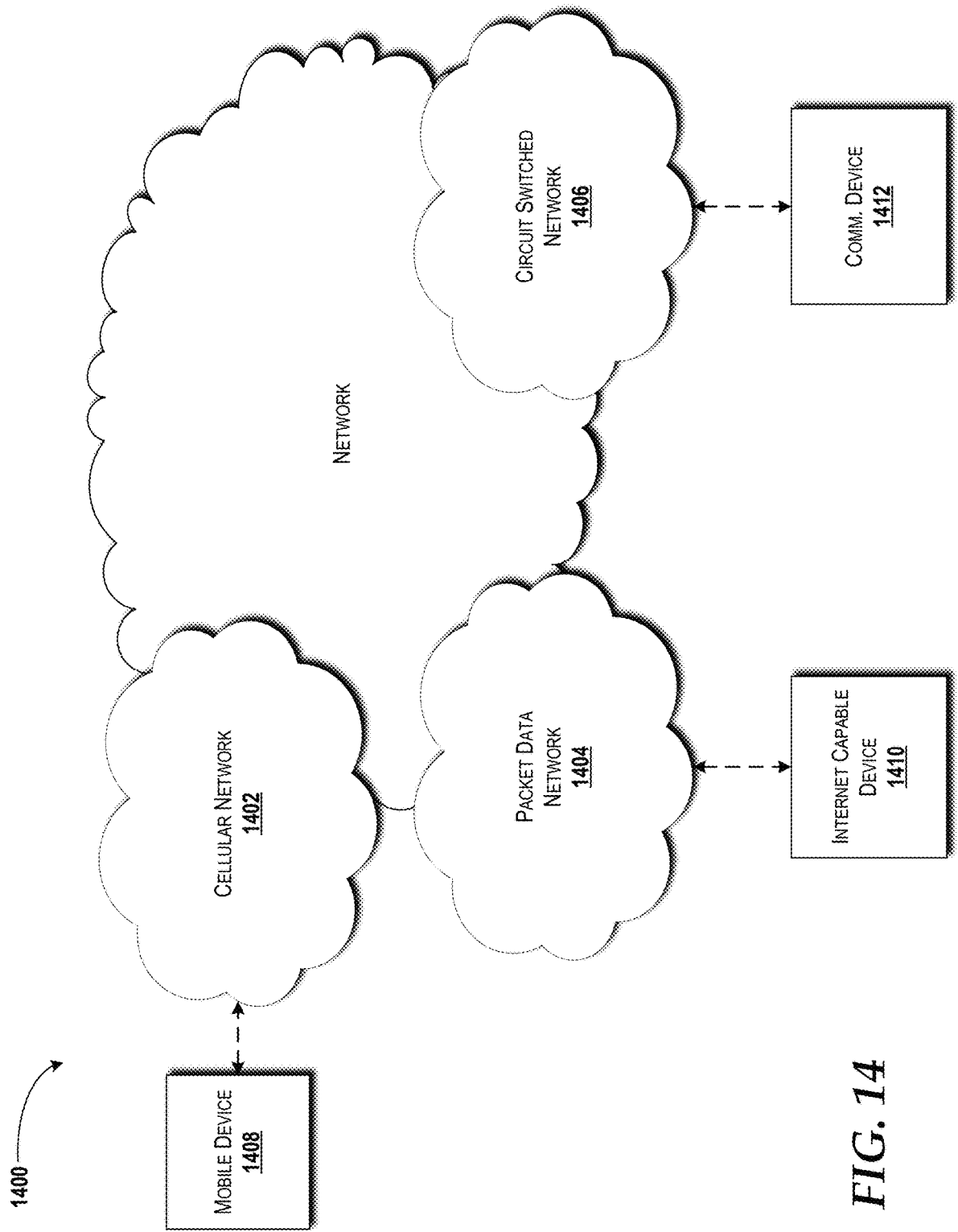
FIG. 14 schematically illustrates a network, according to an illustrative embodiment.

Turning now to FIG. 14, additional details of an embodiment of the network 1400 are illustrated, according to an illustrative embodiment. The network 1400 includes a cellular network 1402, a packet data network 1404, for example, the Internet, and a circuit switched network 1406, for example, a publicly switched telephone network ("PSTN"). The cellular network 1402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1402 also includes radios and nodes for receiving and transmitting voice, data, and combinations thereof to and from radio transceivers, networks, the packet data network 1404, and the circuit switched network 1406.

A mobile communications device 1408, such as, for example, the mobile device 1300, a cellular telephone, a user equipment, a mobile terminal, a PDA, a laptop computer, a handheld computer, and combinations thereof, can be operatively connected to the cellular network 1402. The cellular network 1402 can be configured as a 2G GSM network and can provide data communications via GPRS and/or EDGE. Additionally, or alternatively, the cellular network 1402 can be configured as a 3G UMTS network and can provide data communications via the HSPA protocol family, for example, HSDPA, EUL (also referred to as HSUPA), and HSPA+. The cellular network 1402 also is compatible with 4G mobile communications standards as well as evolved and future mobile standards. In some embodiments, the mobile telecommunications network 102 can be configured like the cellular network 1402.

The packet data network 1404 includes various devices, for example, servers, computers, databases, and other devices in communication with one another, as is generally known. The packet data network 1404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1404 includes or is in communication with the Internet.

The circuit switched network 1406 includes various hardware and software for providing circuit switched communications. The circuit switched network 1406 may include, or may be, what is often referred to as a plain old telephone system ("POTS"). The functionality of a circuit switched network 1406 or other circuit-switched network are generally known and will not be described herein in detail.

The illustrated cellular network 1402 is shown in communication with the packet data network 1404 and a circuit switched network 1406, though it should be appreciated that this is not necessarily the case. One or more Internet-capable devices 1408, for example, the camera 104, a personal computer ("PC"), a laptop, a portable device, or another suitable device, can communicate with one or more cellular networks 1402, and devices connected thereto, through the packet data network 1404. It also should be appreciated that the Internet-capable device 1410 can communicate with the packet data network 1404 through the circuit switched network 1406, the cellular network 1402, and/or via other networks (not illustrated).

As illustrated, a communications device 1412, for example, a telephone, facsimile machine, modem, computer, or the like, can be in communication with the circuit switched network 1406, and therethrough to the packet data network 1404 and/or the cellular network 1402. It should be appreciated that the communications device 1412 can be an Internet-capable device, and can be substantially similar to the Internet-capable device 1410.

Figure 15:
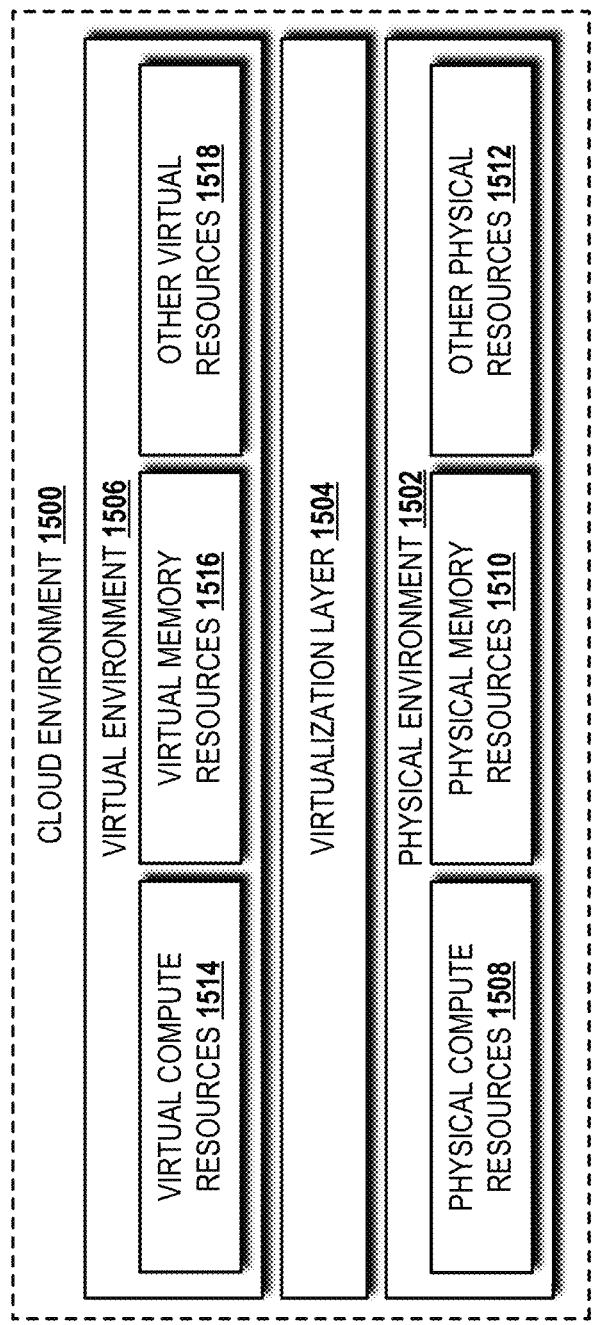
FIG. 15 is a block diagram illustrating a cloud computing environment capable of implementing aspects of the concepts and technologies disclosed herein.

Turning now to FIG. 15, an illustrative cloud environment 1500 will be described, according to an illustrative embodiment. The MEC network(s) 106, the CC network 110, and/or other networks, systems, and/or devices disclosed herein can be implemented and/or controlled, at least in part, in/by the cloud environment 1500.

The cloud environment 1500 includes a physical environment 1502, a virtualization layer 1504, and a virtual environment 1506. While no connections are shown in FIG. 15, it should be understood that some, none, or all of the components illustrated in FIG. 15 can be configured to interact with one other to carry out various functions described herein. In some embodiments, the components are arranged so as to communicate via one or more networks. Thus, it should be understood that FIG. 15 and the remaining description are intended to provide a general understanding of a suitable environment in which various aspects of the embodiments described herein can be implemented, and should not be construed as being limiting in any way.

The physical environment 1502 provides hardware resources that, in the illustrated embodiment, include one or more physical compute resources 1508, one or more physical memory resources 1510, and one or more other physical resources 1512. The MEC resources 122 and the CC resources 128 can be or can include at least a portion of the hardware resources.

The physical compute resource(s) 1508 can include one or more hardware components that perform computations to process data and/or to execute computer-executable instructions of one or more application programs, one or more operating systems, and/or other software. The physical compute resources 1508 can include one or more central processing units ("CPUs") configured with one or more processing cores. The physical compute resources 1508 can include one or more graphics processing unit ("GPU") configured to accelerate operations performed by one or more CPUs, and/or to perform computations to process data, and/or to execute computer-executable instructions of one or more application programs, one or more operating systems, and/or other software that may or may not include instructions particular to graphics computations. In some embodiments, the physical compute resources 1508 can include one or more discrete GPUs. In some other embodiments, the physical compute resources 1508 can include CPU and GPU components that are configured in accordance with a co-processing CPU/GPU computing model, wherein the sequential part of an application executes on the CPU and the computationally-intensive part is accelerated by the GPU processing capabilities. The physical compute resources 1508 can include one or more system-on-chip ("SoC") components along with one or more other components, including, for example, one or more of the physical memory resources 1510, and/or one or more of the other physical resources 1512. In some embodiments, the physical compute resources 1508 can be or can include one or more SNAP-DRAGON SoCs, available from QUALCOMM of San Diego, Calif.; one or more TEGRA SoCs, available from NVIDIA of Santa Clara, Calif.; one or more HUMMING-BIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The physical compute resources 1508 can be or can include one or more hardware components architected in accordance with an ARM architecture, available for license from ARM HOLDINGS of Cambridge, United Kingdom. Alternatively, the physical compute resources 1508 can be or can include one or more hardware components architected in accordance with an x86 architecture, such an architecture available from INTEL CORPORATION of Mountain View, Calif., and others. Those skilled in the art will appreciate the implementation of the physical compute resources 1508 can utilize various computation architectures, and as such, the physical compute resources 1508 should not be construed as being limited to any particular computation architecture or combination of computation architectures, including those explicitly disclosed herein.

The physical memory resource(s) 1510 can include one or more hardware components that perform storage/memory operations, including temporary or permanent storage operations. In some embodiments, the physical memory resource(s) 1510 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the physical compute resources 1508.

The other physical resource(s) 1512 can include any other hardware resources that can be utilized by the physical compute resources(s) 1508 and/or the physical memory resource(s) 1510 to perform operations described herein. The other physical resource(s) 1512 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The physical resources operating within the physical environment 1502 can be virtualized by one or more virtual machine monitors (not shown; also known as "hypervisors") operating within the virtualization/control layer 1504 to create virtual resources that reside in the virtual environment 1506. The virtual machine monitors can be or can include software, firmware, and/or hardware that alone or in combination with other software, firmware, and/or hardware, creates and manages virtual resources operating within the virtual environment 1506.

The virtual resources operating within the virtual environment 1506 can include abstractions of at least a portion of the physical compute resources 1508, the physical memory resources 1510, and/or the other physical resources 1512, or any combination thereof, shown as virtual compute resources 1514, virtual memory resources 1516, and other virtual resources 1518, respectively. In some embodiments, the abstractions can include one or more virtual machines upon which one or more applications can be executed. The MEC resources 122 and the CC resources 128 can be or can include at least a portion of the virtual resources.

Based on the foregoing, it should be appreciated that aspects of data-driven event detection for compressed video have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A network system comprising:
   a camera operating in communication with a mobile telecommunications network;
   a video encoder associated with the camera, wherein the video encoder comprises a best parameter configuration, wherein the best parameter configuration comprises a group of pictures size and a scenecut threshold, and wherein the best parameter configuration is a highest value of a harmonic mean between an accuracy of event detection and a filtering rate;
   a first object recognizer deployed in a mobile edge cloud neural network, wherein the mobile edge cloud neural network operates at an edge of the mobile telecommunications network;
   a second object recognizer deployed in a central cloud neural network, wherein the central cloud neural network operates in communication with the mobile telecommunications network and the mobile edge cloud neural network;

wherein the camera performs camera operations comprising capturing a video comprising a plurality of video frames;

wherein the video encoder performs video encoder operations comprising encoding the video based upon the best parameter configuration of the group of pictures size and thereby generating an encoded video comprising a plurality of I-frames;

wherein the first object recognizer performs first object recognizer operations comprising receiving the encoded video and processing at least a first I-frame of the plurality of I-frames in the encoded video; and wherein the second object recognizer performs second object recognizer operations comprising receiving the first I-frame from the first object recognizer after the first object recognizer has processed at least the first I-frame of the encoded video and further processing at least the first I-frame of the encoded video.

2. The network system of claim 1, wherein a first execution cost in terms of time is associated with the first object recognizer processing at least the first I-frame.

3. The network system of claim 2, wherein the plurality of I-frames comprises an N number of I-frames.

4. The network system of claim 3, wherein a total latency for the N number of I-frames is equal to a product of the N number of I-frames and the first execution cost.

5. The network system of claim 3, wherein a transmission cost is associated with transmitting the first I-frame from the first object recognizer to the second object recognizer.

6. The network system of claim 5, wherein a queuing time is associated with the first object recognizer queuing the processing of at least the first I-frame.

7. The network system of claim 6, wherein a second execution cost in terms of time is associated with the second object recognizer further processing at least the first I-frame.

8. The network system of claim 7, wherein a total latency for the N number of I-frames is equal to a sum of a product of the N number of I-frames and the queuing time, the transmission cost, and the second execution cost.

9. A method comprising:
receiving, from a camera comprising a video encoder, by a first object recognizer deployed in a mobile edge cloud neural network operating at an edge of a mobile telecommunications network, an encoded video comprising a plurality of I-frames, wherein the encoded video comprises a video encoded by the video encoder based upon a best parameter configuration, wherein the best parameter configuration comprises a group of pictures size and a scenecut threshold, and wherein the best parameter configuration is a highest value of a harmonic mean between an accuracy of event detection and a filtering rate;

processing, by the first object recognizer, at least a first I-frame of the plurality of I-frames in the encoded video; and after processing at least the first I-frame, providing, by the first object recognizer, at least the first I-frame to a second object recognizer for further processing, wherein the second object recognizer is deployed in a central cloud neural network operating in communication with the mobile telecommunications network and the mobile edge cloud neural network.

10. The method of claim 9, wherein a first execution cost in terms of time is associated with the first object recognizer processing at least the first I-frame.

11. The method of claim 10, wherein the plurality of I-frames comprises an N number of I-frames.

12. The method of claim 11, wherein a total latency for the N number of I-frames is equal to a product of the N number of I-frames and the first execution cost.

13. The method of claim 11, wherein a transmission cost is associated with transmitting the first I-frame from the first object recognizer to the second object recognizer.

14. The method of claim 13, wherein a queuing time is associated with the first object recognizer queuing the processing of at least the first I-frame.

15. The method of claim 14, wherein a second execution cost in terms of time is associated with the second object recognizer further processing at least the first I-frame.

16. The method of claim 15, wherein a total latency for the N number of I-frames is equal to a sum of a product of the N number of I-frames and the queuing time, the transmission cost, and the second execution cost.

17. A computer-readable storage medium comprising computer-executable instructions that, when executed by a processor of a first object recognizer deployed in a mobile edge cloud neural network operating at an edge of a mobile telecommunications network, cause the processor to perform operations comprising:
receiving, from a camera comprising a video encoder, an encoded video comprising a plurality of I-frames, wherein the encoded video comprises a video encoded by the video encoder based upon a best parameter configuration, wherein the best parameter configuration comprises a group of pictures size and a scenecut threshold, and wherein the best parameter configuration is a highest value of a harmonic mean between an accuracy of event detection and a filtering rate;

processing at least a first I-frame of the plurality of I-frames in the encoded video; and after processing at least the first I-frame, providing, by the first object recognizer, at least the first I-frame to a second object recognizer for further processing, wherein the second object recognizer is deployed in a central cloud neural network operating in communication with the mobile telecommunications network and the mobile edge cloud neural network.

18. The computer-readable storage medium of claim 17, wherein:
a first execution cost in terms of time is associated with the first object recognizer processing at least the first I-frame;
the plurality of I-frames comprises an N number of I-frames; and
a total latency for the N number of I-frames is equal to a product of the N number of I-frames and the first execution cost.

19. The computer-readable storage medium of claim 17, wherein the plurality of I-frames comprises an N number of I-frames.

20. The computer-readable storage medium of claim 19, wherein:
a transmission cost is associated with providing the first I-frame from the first object recognizer to the second object recognizer;
a queuing time is associated with the first object recognizer queuing the processing of at least the first I-frame;

a second execution cost in terms of time is associated with the second object recognizer further processing at least the first I-frame; and a total latency for the N number of I-frames is equal to a sum of a product of the N number of I-frames and the queuing time, the transmission cost, and the second execution cost.

\* \* \* \* \*